United States Patent [19]

Miyazawa et al.

[11] Patent Number: 5,946,658
[45] Date of Patent: *Aug. 31, 1999

[54] CARTRIDGE-BASED, INTERACTIVE SPEECH RECOGNITION METHOD WITH A RESPONSE CREATION CAPABILITY

[75] Inventors: Yasunaga Miyazawa; Mitsuhiro Inazumi; Hiroshi Hasegawa; Isao Edatsune; Osamu Urano, all of Suwa, Japan

[73] Assignee: Seiko Epson Corporation, Tokyo, Japan

[*] Notice: This patent is subject to a terminal disclaimer.

[21] Appl. No.: 09/165,512

[22] Filed: Oct. 2, 1998

Related U.S. Application Data

[63] Continuation of application No. 08/700,175, Aug. 20, 1996, Pat. No. 5,842,168, which is a continuation-in-part of application No. 08/536,563, Sep. 29, 1995, Pat. No. 5,794,204.

[30] Foreign Application Priority Data

Aug. 21, 1995 [JP] Japan .................................. 7-212249

[51] Int. Cl.$^6$ .................................. G10L 9/06; G10L 5/02
[52] U.S. Cl. .................... 704/275; 704/244; 704/251; 704/258
[58] Field of Search .................................. 704/244, 251, 704/258, 275

[56] References Cited

U.S. PATENT DOCUMENTS

| 4,305,131 | 12/1981 | Best .................................. 345/327 |
| 4,984,177 | 1/1991 | Rondel et al. .................... 704/277 |
| 5,357,596 | 10/1994 | Takebayashi et al. ............. 704/275 |
| 5,384,892 | 1/1995 | Strong ............................... 704/243 |
| 5,548,681 | 8/1996 | Gleaves et al. .................... 704/233 |
| 5,577,165 | 11/1996 | Takebayashi et al. ............. 704/275 |
| 5,842,168 | 11/1998 | Miyazawa et al. ................. 704/275 |

FOREIGN PATENT DOCUMENTS

| 62-253093 | 11/1987 | Japan . |
| 6-4097 | 1/1994 | Japan . |
| 6-119476 | 4/1994 | Japan . |

Primary Examiner—David R. Hudspeth
Assistant Examiner—Tālivaldis Ivars Šmits
Attorney, Agent, or Firm—Michael T. Gabrik

[57] ABSTRACT

A technique for improving speech recognition in low-cost, speech interactive devices. This technique calls for selectively implementing a speaker-specific word enrollment and detection unit in parallel with a word detection unit to permit comprehension of spoken commands or messages when no recognizable words are found. Preferably, specific speaker detection will be based on the speaker's own personal list of words or expression. Other facets include complementing non-specific pre-registered word characteristic information with individual, speaker-specific verbal characteristics to improve recognition in cases where the speaker has unusual speech mannerisms or accent and response alteration in which speaker-specification registration functions are leveraged to provide access and permit changes to a predefined responses table according to user needs and tastes. Also disclosed is the externalization and modularization of non-specific speaker recognition, action and response information to enhance adaptability of the speech recognizer without sacrificing product cost competitiveness or overall device responsiveness.

10 Claims, 13 Drawing Sheets

| 0 | RESPONSE CONTENT A0 |
| 1 | RESPONSE CONTENT A1 |
| 2 | RESPONSE CONTENT A2 |
| ⋮ | ⋮ |
| 99 | RESPONSE CONTENT A99 |

| 100 | RESPONSE CONTENT a0 |
| 101 | RESPONSE CONTENT a1 |
| 102 | RESPONSE CONTENT a2 |
| | |

CARTRIDGE-BASED, INTERACTIVE SPEECH RECOGNITION METHOD WITH A RESPONSE CREATION CAPABILITY

CROSS REFERENCE TO RELATED APPLICATIONS

This is a Continuation of prior application Ser. No. 08/700,175 filed on Aug. 20, 1996, now U.S. Pat. No. 5,842,168, which is a continuation-in-part of Ser. No. 08/536,563 filed on Sep. 29, 1995 which is now U.S. Pat. No. 5,794,204.

This application is related to copending application Ser. No. 08/700,181, filed on Aug. 20, 1996, entitled "Voice Activated Interactive Speech Recognition Device And Method", and copending application Ser. No. 08/699,874, filed on Aug. 20, 1996, entitled "Speech Recognition Device And Processing Method", all commonly assigned with the present invention to the Seiko Epson Corporation of Tokyo, Japan. This application is also related to the following applications: application Ser. No. 08/078,027, filed Jun. 18, 1993, entitled "Speech Recognition System", now abandoned; application Ser. No. 08/641,268, filed Sep. 29, 1995, entitled Speech Recognition System Using Neural Networks, which is a continuation of application Ser. No. 08/078,027 and which is now U.S. Pat. No. 5,751,904, issued May 12, 1998; application Ser. No. 08/102,859, filed Aug. 6, 1993, entitled "Speech Recognition Apparatus", now U.S. Pat. No. 5,481,644, issued Jan. 2, 1996; application Ser. No. 08/485,134, filed Jun. 7, 1995, entitled "Speech Recognition Apparatus Using Neural Network and Learning Method Therefor", now U.S. Pat. No. 5,787,393, issued Jul. 28, 1998; and application Ser. No. 08/536,550, filed Sep. 29, 1996, entitled "Interactive Voice Recognition Method And Apparatus Using Affirmative/Negative Content Discrimination"; all commonly assigned with the present invention to the Seiko Epson Corporation of Tokyo, Japan.

BACKGROUND OF THE INVENTION

1. Field of the Invention

This invention relates generally to speech recognition technology and is particularly concerned with portable, intelligent, interactive devices responsive to non-speaker specific commands or instructions.

2. Description of the Related Art

An example of conventional portable interactive speech recognition equipment is a speech recognition toy. For example, the speech recognition toy that was disclosed by the Japanese Laid Open Publication S62-253093 contains a plurality of pre-registered commands that are objects of recognition. The equipment compares the voice signals emitted by the children or others who are playing with the toy to voice signals pre-registered by a specific speaker. If perceived voice happens to match one or more of the pre-registered signals, the equipment generates a pre-determined electrical signal corresponding to the matched voice command, and causes the toy to perform specific operations based on the electrical signal.

However, because these toys rely on a particular individual's speaking characteristics (such as intonation, inflection, and accent) captured at a particular point in time and recognize only a prestored vocabulary, they quite frequently fail to recognize words and expressions spoken by another person, and apt not even to tolerate even slight variations in pronunciation by the registered speaker. These limitations typically lead to misrecognition or nonrecognition errors which may frustrate or confuse users of the toy, especially children, which, in turn, leads to disuse once the initial novelty has worn off. Further, speaker and word pre-registration is extremely time-consuming and cumbersome, since every desired expression must be individually registered one-by-one basis prior to use by a new speaker.

One potential solution may be to incorporate into such devices non-specific speech recognition equipment which uses exemplars from a large population of potential speakers (e.g. 200+ individuals). This technology does a much better job in correctly recognizing a wide range of speakers, but it too is limited to a predefined vocabulary. However, unlike speaker-specific recognition equipment, the predefined vocabulary cannot be altered by the user to suit individual needs or tastes. Further, proper implementation of these non-speaker specific techniques for suitably large vocabularies require copious amounts of memory and processing power currently beyond the means of most commercially available personal computers and digital assistants, as typically each pre-registered word, along with every speaker variation thereof, must be consulted in order to determine a match. Accordingly, conventional non-speaker specific recognition simply does not provide a practical recognition solution for the ultra-cost sensitive electronic toy, gaming or appliance markets.

Moreover, although specific speech recognition devices can nevertheless achieve relatively high recognition rates for a range of typical users, they cannot always achieve high recognition rate for all types of users. For example, voice characteristics such as interaction and pitch very widely depending on the age and sex of the speaker. The speech recognition device attuned to adult style speech may achieve extremely high recognition rates for adults but may fail miserably with toddlers' voices. Further, conventional non-specific speaker speech recognition could be used by a wide range of people for a wide ranging purposes. Consider the case of a speech recognition device used in an interactive toy context. In this scenario, the degree and type of interaction must be rich and developed enough to handle a wide age range from the toddler speaking his or her first words to mature adolescents, and all the conversation content variations and canned response variation must accommodate this broad range of users in order to enhance the longevity and commercial appeal of such a recognition toy. However as already discussed, a limited memory in processing resources can be devoted to speech recognition in order to make such a speech recognition device cost effective and reasonable responsive. So, heretofore a trade off between hardware costs and responsiveness versus interactably has been observed in nonspecific speaker voice recognizers.

It is, therefore, an object of the present invention to implement an interactive speech recognition method and apparatus that can perform natural-sounding conversations without increasing the number of pre-registered words or canned responses characterized by conventional canned matching type speech recognition. Moreover, it is a further object of the present invention to incorporate recognition accuracy and features approaching non-specific speaker speech recognition in a device relatively simple in configuration, low in price, easily manufactured, and easily adaptable to suit changing needs and uses. It is yet a further object of the present invention to provide a highly capable, low-cost interactive speech recognition method and apparatus which can be applied to a wide range of devices such as toys, game machines and ordinary electronic devices.

It is still a further object of the present invention to prove nonspecific speaker recognition rates for a wider range of voices then heretofore could be accommodated using conventional memory constructs. It is even a further object of the present invention that a wider range of conversation responses and detected phrases be accommodated on an as needed basis.

SUMMARY OF THE INVENTION

In accordance with these and related objects, the speech recognition technique of the present invention include: 1) voice analysis, which generates characteristic voice data by analyzing perceived voice; 2) non-specific speaker word identification, which reads the characteristic voice data and outputs detected data corresponding to pre-registered words contained within a word registry; 3) potentially, in addition to nonspecific speaker word identification, specific-speaker word enrollment that registers standard voice characteristic data for a select number of words spoken by an individual speaker and outputs detected data when these expressions are subsequently detected; 4) speech recognition and dialogue management, which, based off either/both non-specific or specific speaker word identification, reads the detected voice data, comprehends its meaning and determines a corresponding response; 5) voice synthesis, which generates a voice synthesis output based on the determined response; and 6) voice output, which externally outputs the synthesized response.

According to the preferred embodiments, optional specific speaker word registration outputs word identification data by DP-matching based on the input voice from a specific speaker. It can comprise the following: an initial word enrollment that creates standard patterns by reading characteristic data relative to a specific speaker's prescribed voice input from the voice analysis process; a standard pattern memory process that stores the standard patterns created by the word enrollment process; and a word detection process that outputs word detection data by reading characteristic data relative to the specific-speaker's prescribed voice input and by comparing the characteristic data with said standard patterns. Further, specific speaker word enrollment comprises at least the following: additional word enrollment that creates standard voice patterns that are speaker-adapted based on the standard characteristic voice data for non-specific speakers as spoken by the selected speaker along with speaker-adapted standard pattern memory for storing both the standard patterns that are speaker-adapted and those installed by speaker specific word enrollment. Moreover, specific speaker word enrollment may read characteristic data relative to the specific speaker's prescribed voice input through voice analysis and outputs word detection data by comparing the input characteristic data with the speaker-adapted standard patterns.

Further, the preferred embodiments may include a response creation function. When a particular speaker wishes to add to or modify the existing response list, the preferred embodiment can create response data based on voice signals that have been input by a particular speaker and register them according to instructions given by speech recognition and dialogue management. This permits the creation of new and useful response messages using the voices of a wide variety of people and allows a wide variety of exchanges between the embodiment and users.

Moreover, according to the preferred embodiments of the present invention: 1) word registry storage, including standard pattern memories containing the characteristic voice vectors for each registered word (either speaker specific, non-speaker specific or a combination thereof; and/or 2) conversation content storage for retaining canned context rules and response procedures when recognized words or phrases are encountered; and/or 3) response data storage for retaining response voice vector data used in formulating an appropriate response to perceived and recognized words and phrases and corresponding context and action rules, may collectively or singularly reside within memory provided on a removable cartridge external to and in communication with the speech recognition processor. Of course, necessary protocol glue and buffering logic, along with conventional bus architecture control drivers and protocols will be included as necessary to permit proper (at least read-only) communications between these cartridge memories and the various components of the speech recognition processor, including, but not limited to, the word or phrase identifier (preferably non-speaker specific), the speech recognition and dialogue management unit, and the voice synthesis unit.

By offloading these memories and information onto a modular removable cartridge and away from a central speech recognition processor, it becomes possible to tailor conversations to users of various ages, backgrounds or gender, as well as increase the available groups of pre-registered words and/or responses, all without dramatically increasing memory size and costly memory parts counts. Only a small additional expense will be required to accommodate cartridge information transfer operations to the speech processor, as well as engagement hardware to complete the electrical interconnection between the cartridge memories and the main speech recognition processing unit. Moreover, since it is anticipated that the overall memory size of each cartridge approximates the memory size of a conventional internalized memory speech recognition system, processing matching speed and overall responsiveness should not be seriously impacted by inclusion of the external cartridge paradigm. Again, here, the speech recognition processing unit in this embodiment may be required to implement additional communication overhead in order to communicate with the coupled memory cartridge, but incorporating such additional processing burdens is more than out weighed by the benefits of modularity and adaptability secured by including recognition, context and response information on removable storage such as the memory cartridge.

Thus, one aspect of the present invention couples simple non-specific speaker speech recognition with specific speaker expression enrollment and detection. Further, non-specific pre-registered words can be speaker-adapted to permit more accurate and quicker recognition. In certain situations, some words are recognized and other words are not depending on the manner in which a particular speaker utters them. With some speakers, no non-specific pre-registered words can be recognized at all. In such cases, words that fail to be recognized can be enrolled using a specific-speaker voice enrollment function. This virtually eliminates words that cannot be recognized and thus substantially improves the overall recognition capability of the equipment. This function also allows specific speakers to enroll new words suited to the user's individual needs and tastes which are not included in the non-specific word registry.

Further, the preferred embodiments may include a response creation function which permits alteration or additions to a predefined response list, thereby improving its depth and range of usefulness.

Moreover, the non-speaker specific or speaker-specific word registries, recognition contextual rules, conversation response action rules, and audible response information may all be stored singularly or in combination or external cartridge memory to accommodate wider ranges of speakers and applications having disparate conversation sets without significantly impacting device cost or composite recognition performance. This is true, even though the rest of the speech recognition processing equipment may be unitized to reduce cost and case manufacturability. If, in the case of a toy application, a cartridge is used to store recognition, conversation control and response information, the toy can adapt and grow with the child, even when "canned" non-speaker specific phrase identification techniques are utilized. Also, the recognition registry, conversation and response information can be changed or updated as the general culture changes, thereby greatly increasing the longevity and usefulness of the cartridge-equipped speech recognition apparatus. Of course, the cartridge information can also be used to broaden potential speakers and maintain acceptable recognition rates by tailoring the "canned" non-speaker specific registration list to particular dialects, regional lingual idiosyncrasies or even different languages. In such cases, a given speaker may simply select and connect the most appropriate cartridge for his or her own inflections, accent or language.

Other objects and attainments together with a fuller understanding of the invention will become apparent and appreciated by referring to the following description of the presently preferred embodiments and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

As depicted in the figures, the presently preferred embodiments exemplify speech recognition techniques of the present invention as applied to an inexpensive voice-based toy, gaming device, or similar interactive appliance. Though one having ordinary skill in the speech recognition art will recognize that the teachings of the present invention are not so limited, the presently preferred embodiments can be conveniently implemented as a stand-alone speech recognition device residing within a stuffed doll such as dog, cat or bear suitable for young children.

Figure 1:
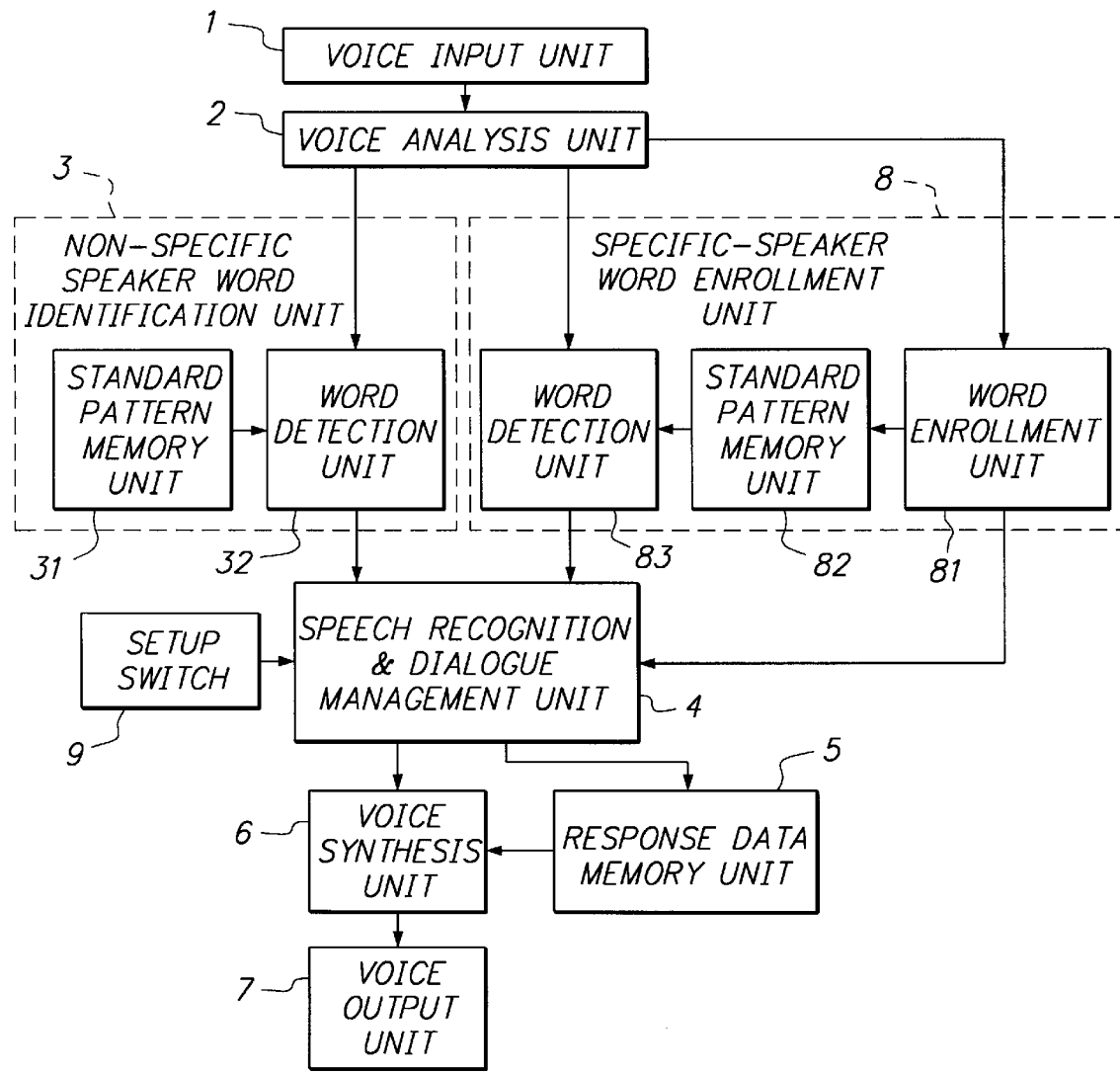
FIG. 1 is an overall block diagram of the first preferred embodiment.

FIG. 1 shows a configuration diagram that depicts the first preferred embodiment of the present invention. In FIG. 1, the following components are designed to recognize words spoken by non-specific speakers and to generate response messages according to the results of the recognition: voice input unit 1, which inputs the speaker's voice; voice analysis unit 2, which outputs characteristic voice data by analyzing the input voice; non-specific speaker word identification unit 3, which reads the characteristic voice data from voice analysis unit 2 and outputs the detected data corresponding to the registered words contained in the input voice, based on a non-specific speaker's standard characteristic voice data relative to pre-registered recognizable words; speech recognition and dialogue management unit 4; response data memory unit 5, which stores pre-set response data; voice synthesis unit 6; and voice output unit 7. Also shown in FIG. 1, a specific-speaker word registration means 8 is provided that registers the standard characteristic voice data on the words uttered by a specific speaker based on the specific speaker's input voice and that outputs word detection data on the specific speaker's input voice. Further, setup switch 9 is provided to serve as a data input setup means for performing various data input setup actions by an individual user.

The non-specific speaker word identificationunit 3 preferably comprises the following: standard pattern memory unit 31, which stores standard voice vector patterns or standard characteristic voice data that correspond to each pre-registered word contained in the word registry; and word detection unit 32, which generates word detection data preferably in the form of a word lattice by reading characteristic voice data from voice analysis unit 2 and by comparing them against the standard non-specific speakers patterns contained in the standard pattern memory unit 31.

The standard pattern memory unit 31 stores (registers) standard patterns of target-of-recognition words that are created beforehand using the voices of a large number of speakers (e.g., 200 people) for each of the words. Since these embodiments are directed to a low-cost toy or novelty, approximately 10 words are chosen as target-of-recognition words. Although the words used in the embodiment are mostly greeting words such as the Japanese words "Ohayou"

meaning "good morning", "oyasumi" meaning "good night", and "konnichiwa" meaning "good afternoon", the present invention is, of course, by no means limited to these words or to merely the Japanese language. In fact, various words in English, French or other language can be registered, and the number of registered words is not limited to 10. Though not shown in FIG. 1, word detection unit 32 is principally composed of a processor (the CPU) and ROM that stores the processing program. Its function is to determine on what confidence level the words registered in standard pattern memory unit 31 occur in the input voice, and will be described in more detail hereinbelow.

On the other hand, specific-speaker word enrollment unit 8 preferably comprises the following: word enrollment unit 81; standard pattern memory unit 82, which stores input voice standard patterns as the standard characteristic voice data on the input voice; and word detection unit 83. In this embodiment, the specific-speaker word enrollment unit registers the words uttered by specific speakers by entering their voice signals and outputting the detected data in the form of a word lattice for specific-speaker registered words relative to the input voice. In this example, it is assumed that the input voice is compared with registered standard voice patterns by DP-matching, and word identification data is output from word detection unit 83 based on the results of the comparison. The registration of words by specific-speaker word enrollment unit 8 can be performed by setting the word registration mode using setup switch 9, as will be discussed in greater detail hereinbelow.

Still referring to FIG. 1, voice input unit 1 is composed of the following conventional sub-components which are not shown in the figure: a microphone, an amplifier, a low-pass filter, an A/D converter, and so forth. The voice which is input from the microphone is converted into an appropriate audio waveform after the voice is allowed to pass through the amplifier and the low-pass filter. The audio waveform is then converted into digital signals (e.g., 12 KHz sampling rate at 16 bit resolution) by the A/D converter and is output to voice analysis unit 2. Voice analysis unit 2 takes the audio waveform signals transmitted from voice input unit 1 and uses a processor (the CPU) to perform a frequency analysis at short time intervals, extracts characteristic vectors (commonly LPC-Cepstrum coefficients) of several dimensions that express the characteristic of the frequency, and outputs the time series of the characteristic vectors (hereinafter referred to as "characteristic voice vector series"). It should be noted that said non-specific speaker word data output means 3 can be implemented using the hidden Markov model (HMM) method or the DP-matching method. However, in this example keyword-spotting processing technology using the dynamic recurrent neural network (DRNN) method is used as disclosed by Applicants in U.S. application Ser. No. 08/078,027, filed Jun. 18, 1993, entitled "Speech Recognition System", commonly assigned with the present invention to Seiko-Epson Corporation of Tokyo, Japan, which is incorporated fully herein by reference. Also, this method is disclosed in the counterpart laid open Japanese applications H6-4097 and H6-119476. DRNN is preferably used in order to perform speech recognition of virtually continuous speech by non-specific speakers and to output word identification data as described herein.

Figure 2A:
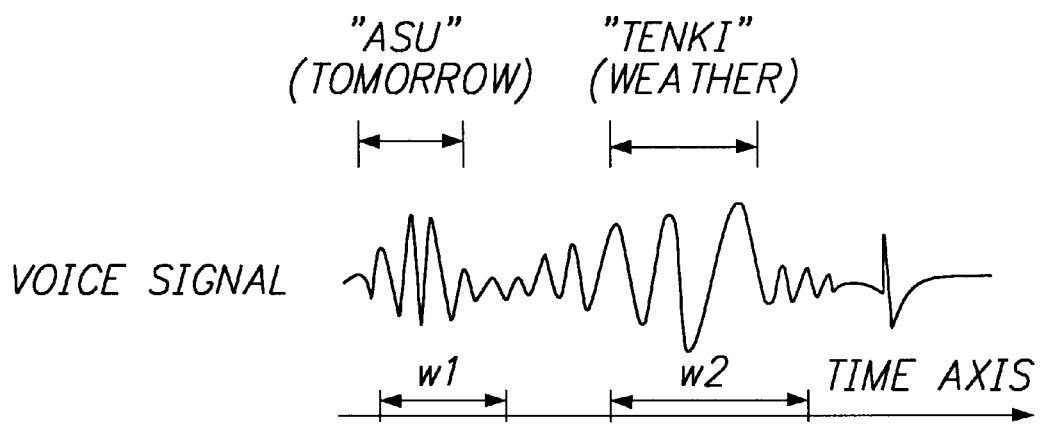
FIGS. 2A–2E diagrammatically illustrate a sample input voice waveform and resultant word lattice generated by the non-specific speaker word identification unit of the embodiment shown in FIG. 1.

The following is a brief explanation of the specific processing performed by non-specific speaker word data identification unit 3 with reference to FIGS. 2A–2E. Word detection unit 32 determines the confidence level at which a word registered in standard pattern memory unit 31 occurs at a specific location in the input voice. Now, suppose that the speaker inputs an example Japanese language phrase "asu No tenki wa . . . " meaning "Concerning tomorrow's weather". Assume that in this case the stylized voice signal shown in FIG. 2A represents the audio waveform for this expression.

In the expression "asu no tenki wa . . . ", the contextual keywords include "asu" (tomorrow) and "tenki" (weather). These are stored in the form of patterns in standard pattern memory unit 31 as parts of the a predetermined word registry, which in this case, represents approximately 10. If 10 words are registered, signals are output in order to detect words corresponding to these 10 words (designated word 1, word 2, word 3 . . . up to word 10). From the information such as detected signal values, the word identification unit determines the confidence level at which the corresponding words occur in the input voice.

Figure 2B:
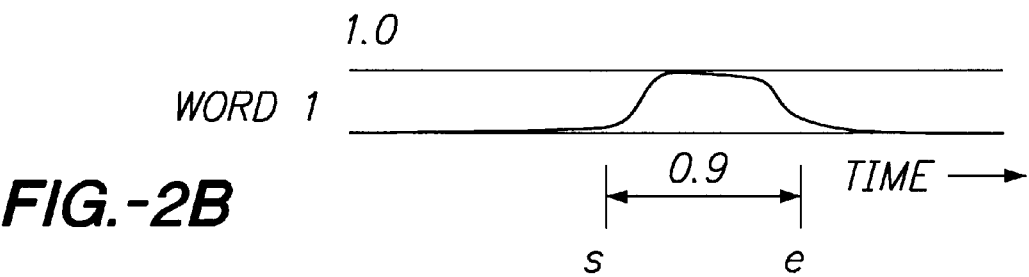
Figure 2C:
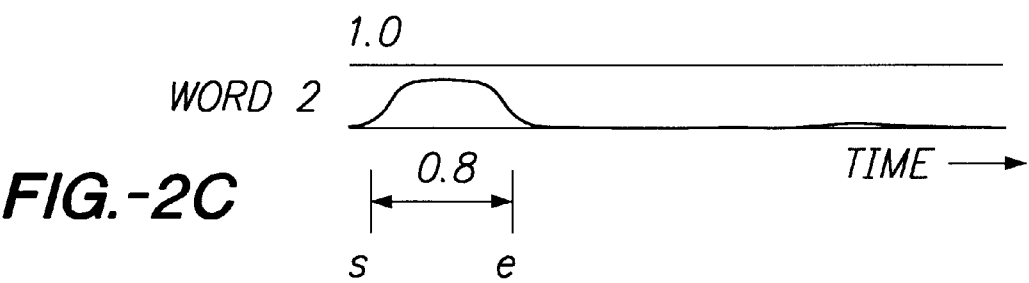
Figure 2D:
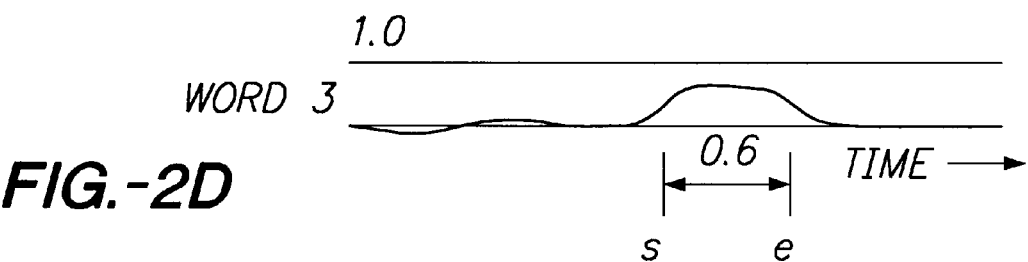
Figure 2E:

More specifically, if the word "tenki" (weather) occurs in the input voice as word 1, the detection signal that is waiting for the signal "tenki" (weather) rises at the portion "tenki" in the input voice, as shown in FIG. 2B. Similarly, if the word "asu" (tomorrow) occurs in the input voice as word 2, the detection signal that is waiting for the signal "asu" rises at the portion "asu" in the input voice, as shown in FIG. 2C. In FIGS. 2B and 2C, the numerical values 0.9 and 0.8 indicate respective confidence levels that the spoken voice contains the particular pre-registered keyword. The relative level or magnitude of this level can fluctuate between ~0 and 1.0, with 0 indicating a nearly zero confidence match factor and 1.0 representing a 100% confidence match factor. In the case of a high confidence level, such as 0.9 or 0.8, the registered word having a high confidence level can be considered to be a recognition candidate relative to the input voice. Thus, the registered word "asu" occurs with a confidence level of 0.8 at position w1 on the time axis. Similarly, the registered word "tenki" occurs with a confidence level of 0.9 at position w2 on the time axis.

Also, the example of FIGS. 2A–2E show that, when the word "tenki" (weather) is input, the signal that is waiting for word 3 (word 3 is assumed to be the registered word "nanji" ("What time . . . ") also rises at position w2 on the time axis with an uncertain confidence level of approximately 0.6. Thus, if two or more registered words exist as recognition candidates at the same time relative to an input voice signal, the recognition candidate word is determined by one of two methods: either by 1)selecting the potential recognition candidate with the highest degree of similarity to the input voice using confidence level comparisons as the actually recognized keyword; or a method of selecting one of the words as the recognized word by creating beforehand a correlation table expressing correlation rules between words. In this case, the confidence level for "tenki" (weather) indicates that it has the highest degree of similarity to the input voice during time portion w2 on the time axis even though "nanji" can be recognized as a potential recognition candidate. Based on these confidence levels, the speech recognition and dialogue management unit 4 performs the recognition of input voices.

Collectively, the detection information, including starting and ending points on the time axis and the maximum magnitude of the detection signal indicating the confidence level, for each pre-registered word contained in non-specific speaker word registry within standard pattern memory unit 31 is known as a word lattice.

In FIGS. 2B–2E, only a partial lattice is shown for the sake of clarity, but a word lattice including detection information for every pre-registered non-specific word is in fact generated by the word detection unit 32.

Though not shown in FIG. 1, speech recognition and dialogue management unit 4 is principally composed of a processor and ROM that stores the processing program and performs the processing tasks described below. Different CPUs may be provided in the individual units or, alternatively, one CPU can perform the processing tasks for the different units.

Speech recognition and dialogue management unit 4 selects a recognition word output from either non-specific word detection unit 32 or specific speaker word detection unit 83. Based on the composite word lattice, the speech recognition and dialogue management unit recognizes a voice (comprehending the overall meaning of the input voice), references response data memory unit 5, determines a response according to the comprehended meaning of the input voice, and transmits appropriate response information and control overhead to both voice synthesis unit 8 and voice output unit 9.

For example, when the detected data or partial word lattice shown in FIGS. 2B–2E is relayed from word detection unit 32, the speech recognition and dialogue management unit determines one or more potential recognition candidates denoted in the word lattice as a keyword occurring in the input. In this particular example, since the input voice is "asu no tenki wa" (the weather tomorrow), the words "asu"(tomorrow) and "tenki" (weather) are detected. From the keywords "asu" and "tenki", the speech recognition and dialogue management unit understands the contents of the continuous input voice "asu no tenki wa".

The speech recognition processing of virtually continuous voice by keyword spotting processing, as described above, is applicable to other languages as well as to Japanese. If the language to be used is English, for instance, some of the recognizable words that can be registered might be "good morning", "time", "tomorrow", and "good night". The characteristic data on these recognizable registered words is stored in standard memory unit 31. If the speaker asks "What time is it now?", the word "time" in the clause "what time is it now" is used as a keyword in this case. When the word "time" occurs in the input voice, the detection signal that is waiting for the word "time" rises at the portion "time" in the input voice. When detected data (word lattice) from word detection unit 32 is input, one or more words in the input voice is determined as a keyword. Since in this example the input voice is "what time is it now", "time" is detected as a keyword, and the speech recognition conversation control unit understands the contents of the continuous input voice "what time is it now?"

The above description concerns the case where word data is output from non-specific speaker word data output means 3, i.e., the words spoken by the speaker are recognized. With some speakers, however, words like the Japanese expression "Ohayou" (good morning) totally fail to be recognized. Although in some cases changing the way words are spoken can solve the problem, some speakers with voice idiosyncrasies entirely fail to be recognized. In such cases, the words that fail to be recognized can be registered as specific-speaker words. This feature is described below.

Figures 3, 5:
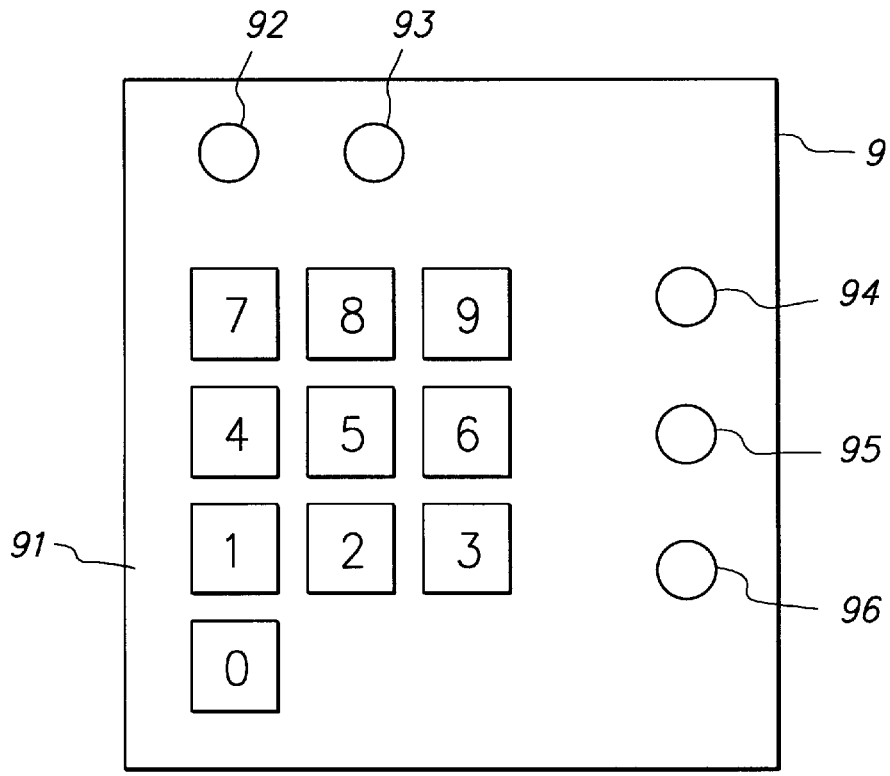
FIG. 3 illustrates an example setup switch according to the first and second preferred embodiments.
FIG. 5 shows a example response table stored in the response data memory unit of the embodiment shown in FIG. 1.
Figure 4A:
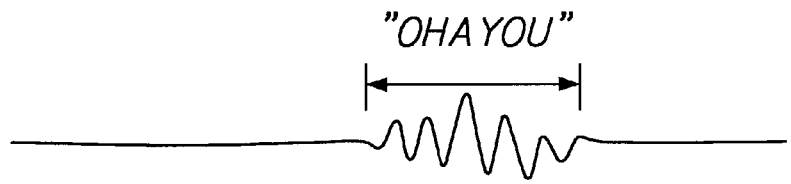
FIGS. 4A–4E diagrammatically illustrate another sample input voice waveform and resultant word lattice generated by the non-specific speaker word identification unit of the embodiment shown in FIG. 1.
Figure 4B:
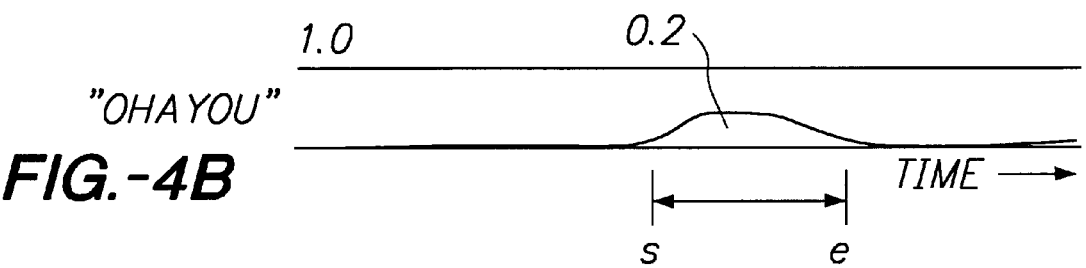
Figure 4C:
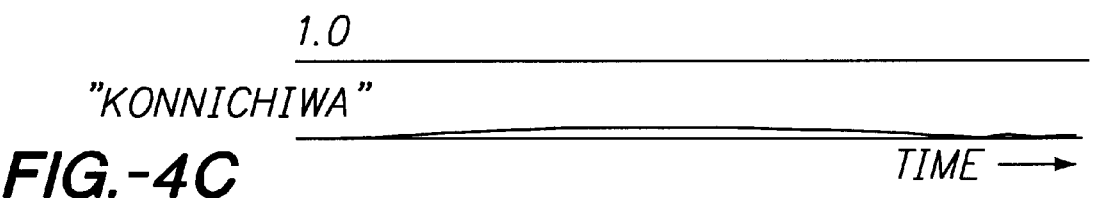
Figure 4D:
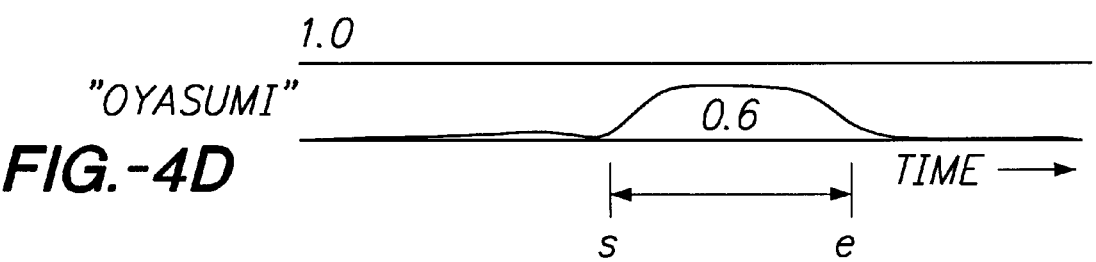
Figure 4E:
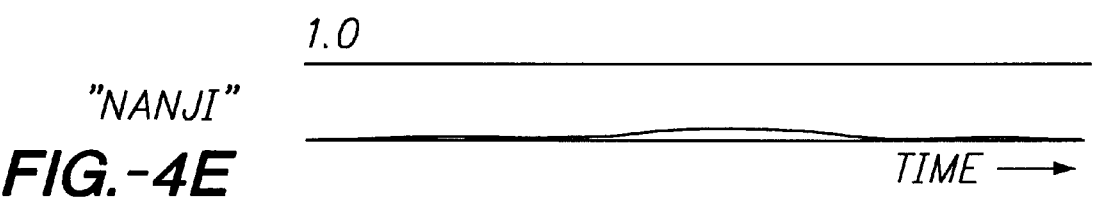

Referring still to FIG. 1, setup switch 9 is used to register specific-speaker words. As shown in FIG. 3, setup switch 9 preferably comprises number key unit 91, start-of-registration button 92, end-of-registration button 93, response message selection button 94, end-of-response message registration button 95, and response number input button 96. Buttons such as response message selection button 94, end-of-response message registration button 95, and response number input button 96 will be described in more detail hereinbelow.

By means of example, this section explains the case where the word "Ohayou" (good morning) is registered as a specific-speaker word because it is not recognized. First, start-of-registration button 92 on setup switch 9 is pushed. This button operation forces speech recognition and dialogue management unit 4 to enter into specific-speaker word registration mode. Normal recognition operations are not performed in this word registration mode.

Suppose that the speaker enters the number for the word "Ohayou" (good morning) (each registered word that is known to be recognizable is preferably assigned a number) from number key unit 91, and "Ohayou" (good morning) is number 1, for example. Then, when the speaker presses the numeric key "1", speech recognition and dialogue management unit 4 detects that the speaker is trying to register the word "Ohayou" (good morning) and performs controls so that the unit outputs a response "Say 'good morning'". When the speaker says "Ohayou" (good morning) because of this prompt, his voice is transmitted from voice input unit 1 to voice analysis unit 2. The characteristic vector that has been voice-analyzed is transmitted to word enrollment unit 81. Word enrollment unit 81 creates standard patterns for the input voice as standard characteristic voice data. The standard pattern is then stored in standard pattern memory unit 82.

The characteristic pattern that is registered as described above can be a standard pattern that uses the characteristic vector column of the word "Ohayou" (good morning) exactly as uttered by the speaker. Alternatively, the speaker can say "Ohayou" (good morning) several times, and the average standard characteristic vector column of the individual characteristic vector columns can be obtained, and a standard pattern can be created from the standard characteristic vector column.

In this manner, words that are uttered by a specific speaker and that cannot be recognized can be registered. Naturally, the registration technique can be performed on all unrecognizable words, not just "Ohayou" (good morning). It is in this manner that the registration of specific-speaker words from unrecognizable words is performed.

The following describes specific examples of conversations between a speaker and the first preferred embodiment. In the speaker's utterances, the words enclosed in brackets indicate keywords used for character recognition.

Suppose that the speaker says "[Ohayou] gozaimasu" meaning "[Good morning] to you . . . ". The voice "Ohayou" is transmitted from voice input unit 1 to voice analysis unit 2, where a voice-analyzed characteristic vector is generated. At this time, word detection unit 32 of non-specific speaker word identification unit 3 and word enrollment unit 83 of specific speaker word enrollment unit 8 are both waiting for a signal from voice analysis unit 2. Word detection units 32 and 83 each outputs word detection data in the form of the aforementioned word lattice that corresponds to the output from voice analysis unit 2. However, the numeric value indicating a degree of confidence contained in the word lattice from word detection unit 83 corresponds a deviation value rather than a degree of similarity.

It should be noted here that the numeric value indicating a degree of confidence contained in the word lattices from word detection unit 32 indicates a degree of similarity to a particular non-speaker specific pre-registered word, such as 0.9 or 0.7, in the case of word detection unit 32, as explained hereinabove with reference to FIGS. 2A–2E. The higher the numerical value, the higher the level of confidence. On the other hand, in the case of word detection unit 83, the numeric value indicates the deviation between the characteristic and the standard patterns of the input voice. Therefore, the smaller the numeric value, the greater the level of confidence that a match has been made. Consequently, when receiving a word lattice from word detection units 32 or 83, speech recognition and dialogue management unit 4 compares each degree of similarity and deviation with respective threshold values th1 and th2 (assume that th1=0.7, th2=0.3) in order to determine potential recognition candidates.

Suppose that when the word "tenki" (weather) is input, word detection unit 32 generates the signal that detects "tenki" with the high degree of similarity of 0.9, as shown in FIG. 2B, the value 0.9 and threshold value th1 (th1=0.7), and if the former is greater than th1, the input voice is recognized to be "tenki".

If the speaker utters the word "Ohayou" (good morning), which is registered as a specific-speaker word, word detection unit 32 generates the word lattice shown in FIGS. 4A–4E, for example. In this case, the degree of similarity between the detection signal for detecting a non-speaker specific "Ohayou" (good morning) relative to the speaker's "Ohayou" (good morning) is a low 0.2. Consequently higher degrees of similarity can sometimes occur in the detection words for detecting other words. In this case, a relatively high degree of similarity (0.6) appears for the non-speaker specific word identification process that is waiting for "oyasumi" (good night).

Word detection unit 83 generates the deviation value that is obtained by comparing the voice signal representing the speaker's "Ohayou" (good morning) and a standard pattern stored in standard pattern memory unit 82. Assume that this deviation is extremely small, such as 0.1, for example.

Speech recognition and dialogue management unit 4 determines one or more actual recognition candidates after receiving word lattices from respective word detection units 32 and 83. In this case, speech recognition and dialogue management unit 4 knows which words in the registered words are specific-speaker registered words (from the fact that word numbers are entered when the speaker registers the words). Therefore, instead of treating the detection signal for detecting "Ohayou" as a recognition target in the word lattice from word detection unit 32, the speech recognition and dialogue management unit uses the detection data shown in FIGS. 4B–4E to compare it with the word lattice from word detection unit 83 (not shown). It should be noted that, although in FIGS. 4A–4E, detection data values for only four words are shown, in actuality the complete word lattice for all non-specific registered words may be input into speech recognition and dialogue management unit 4, as well. Assume that, of all detection data for the non-speaker specific registered words for the speaker's "Ohayou", the highest degree of similarity occurs for "oyasumi" (good night).

Thus, speech recognition dialogue management unit 4 compares degrees of similarity and deviation values from word detection units 32 and 83 with respective threshold values (th1=0.7, th2=0.3), determines recognition candidates, and comprehends the meaning of the input voice. In this case, the highest degree of similarity received from word detection unit 32 is 0.6, which is less than threshold value th1. On the other hand, the deviation for the input voice "Ohayou" from word detection unit 83 is 0.1, which is less than threshold value th2. Therefore, in this case "Ohayou" is determined to be the recognition candidate.

If the highest degree of similarity received from word detection unit 32 is greater than threshold value th1 and the distance value received from word detection unit 83 is less than threshold value th2, some rules should be established beforehand so that either one or the other is determined as a recognition candidate. An example might be to give priority to the data from word detection unit 83 so that it is the recognition candidate, or a response message. Another example might be to generate a response that prompts a re-input from the device side.

Recognition words are determined in response to a speaker's voice input as described above. Moreover, because unrecognizable words (registered words) can be registered as specific-speaker words, the problem of registered words not being recognized can be eliminated. When a recognition word is determined, speech recognition and dialogue management unit 4 comprehends the meaning of the input voice, determines a response, and outputs the response from voice output unit 7. In this case, a fluctuation data detection unit that detects fluctuation data such as time, date, pressure, and temperature, as well as a memory units that store these data, can be provided. Based on these data, wide-ranging response data can be created. For example, if the speaker says "Ohayou" (good morning), the stuffed doll might be able to respond by saying, "Good morning, because it is so nice (from the pressure information), let's go to see the cherry blossoms" (from the date information). In such a conversation, the stuffed doll's response to the speaker's words can be pre-registered in correspondence to the contents of the speaker's words.

The above has been an explanation of how to register specific-speaker words when some words cannot be recognized due to a speaker's idiosyncrasies and how to generate response messages by recognizing such words. In addition, words other than registered words can also be registered as specific-speaker words. In the case of a stuffed doll implementing one of the preferred embodiments, for example, a unique name can be assigned to it and the name can be registered. The following describes how to register the name of an example stuffed doll.

Referring to FIG. 3, the numeric key "0" on number key 91 on setup switch 9 can be designated as the name registration key. In this case, first press start-of-registration button 92, and then press the numeric key "0". This causes the device to generate a message "What is your name?". If the speaker says "Doggie", the name is stored. This is done basically in the same way as storing unrecognized registered words as described above. For example, the speaker can utter "Doggie" several times. A standard pattern is determined from the average characteristic vector column and the results are stored in standard pattern memory unit 82. For the name "Doggie", a response "Bow wow" can be stored beforehand. This enables the device to response "Bow wow" whenever a speaker calls the name "Doggie".

Speaker-specific words can also be stored and response messages can be created for the registered words (with some limitations on the contents of the responses). In this case, an operating procedure manual can be prepared, and response messages can be created by performing the operations according to the manual. This is explained more fully in the following paragraphs.

To implement the above scheme about 100 responses, for example, can be prepared on the device side so that a response is selected according to a word stored specifically by the speaker. In concrete terms, response content numbers 0, 1, 2, . . . can be assigned to response contents such as response content A0, response content A1, response content A2, . . . This information is preferably stored in response data memory unit 5. An operating manual that provides a correspondence table between these response content numbers and the response contents is prepared, and the user sets the response contents for each registered word by following the operating manual and viewing the table. This setting is performed using setup switch 9 as follows:

According to this embodiment, numeric values greater than or equal to "11" are used on number key 91 for the registration of previously unregistered words in order to register words. (It should be noted that the numeric value "0" in this embodiment is used to register names, and the numeric values "1" through "10" are associated with the registered words. These numbers are used to register specific-speaker words when registered words fail to be recognized.) First, press start-of-registration button 92. Then, using number key 91, enter "11", for example. When an expression is voice-input, the standard voice pattern for the expression is stored in standard voice pattern memory unit 82 of the specific speaker word enrollment unit 8. Next, operate response message selection button 94 to select from the response table, the response content appropriate for the registered word. For example to register response content A1 for response content number 1, press response content number input button 96, then press the numeric key "1" that corresponds to response content number 1 on number key 91, and lastly press end-of-response message registration button 95. This ensures that the device generates a response according to response content A1 when the speaker inputs as a voice input the word that was registered by pressing the numeric value key "11 ".

Thus, by using setup switch 9 and numeric values greater than or equal to "11", the user can register user-specific words, and can select and register response contents that are associated with the words that are registered. Further, by combining response content numbers, a wide variety of response contents can be created and registered such as response content A0, response content A2, and response content A4.

The first preferred embodiment described above illustrates an example where a standard pattern was created using a characteristic vector that was generated by the voice analysis of a speaker's voice input, and word detection data (word lattice) was output by comparing the standard pattern with the input voice in order to perform word detection on unrecognizable words by means of DP-matching. By contrast, the second preferred embodiment seeks to perform recognition operations by performing a speaker adaptation using a non-specific-speaker standard pattern model, creating speaker-adapted standard characteristic patterns, and using the new speaker-adapted standard patterns.

Figure 6:
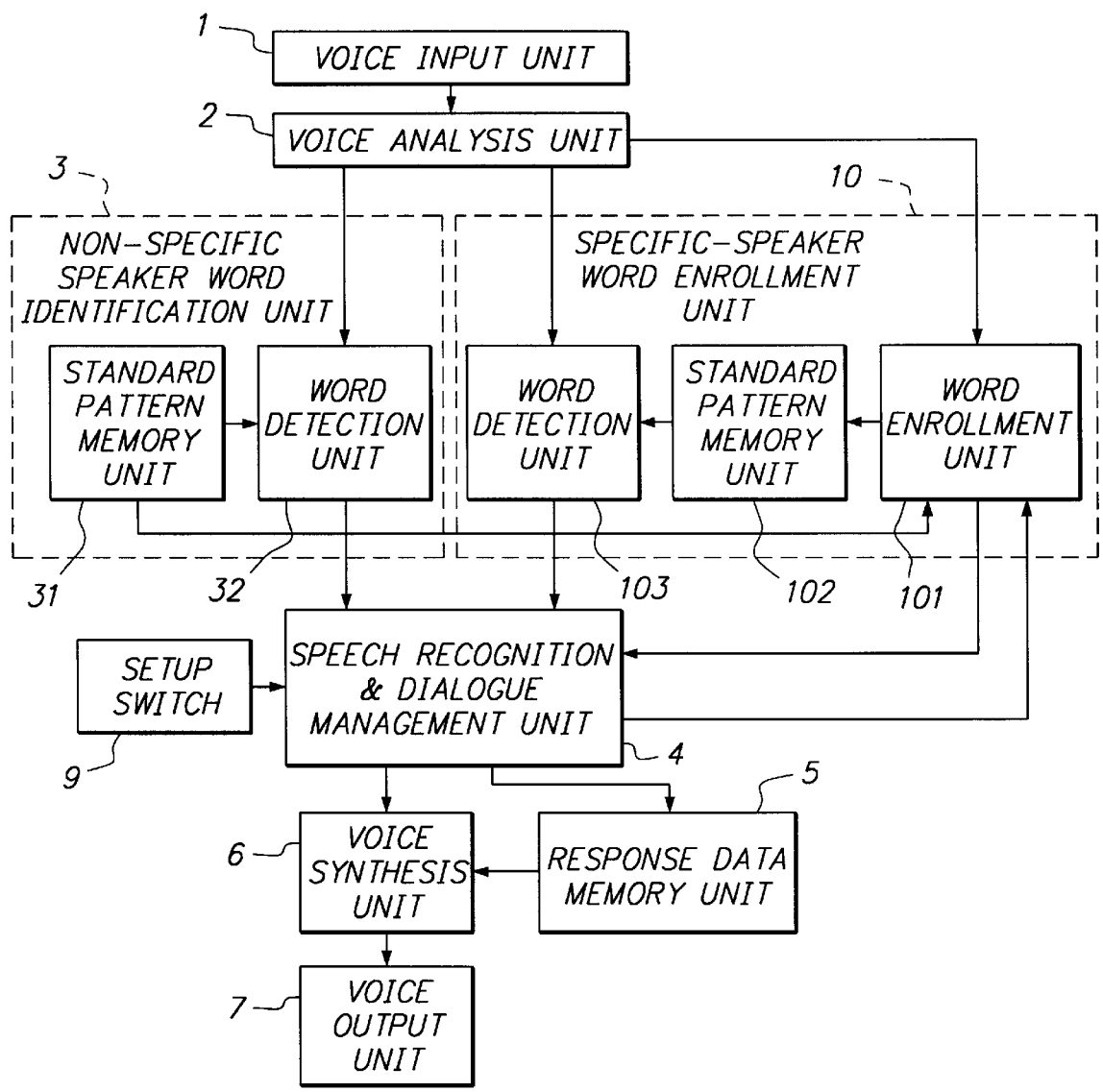
FIG. 6 is an overall block diagram of a second preferred embodiment.

Referring now to FIG. 6, items in FIG. 6 that are identical to those in FIG. 1 are assigned the same indicating numerals. As shown in this figure, the second preferred embodiment comprises the following: voice input unit 1, voice analysis unit 2, non-specific speaker word enrollment unit 3 (standard pattern memory unit 31, word detection unit 32), speech recognition and dialogue management unit 4, response data memory unit 5, voice synthesis unit 6, and setup switch 9. In addition, this embodiment is provided with the following components: specific-speaker word enrollment unit 10 which includes word enrollment unit 101 that generates speaker-adapted standard patterns using the non-specific-speaker standard pattern model of the DRNN based on the input voice (output from voice analysis unit 2) of a specific speaker; speaker-adapted standard pattern memory unit 102, which stores the new speaker-adapted standard patterns that are generated in word enrollment unit 101; and word detection unit 103, which outputs word detection data (word lattice) based on said speaker-adapted standard pattern memory unit 102 and by receiving the output from voice analysis unit 2.

Because this embodiment operates identically with the first preferred embodiment in cases where a speaker's words are recognized, this section need only explain the recognition processing that is performed by the second preferred embodiment when encountering words that fail to be recognized through word detection.

As in the case of the first preferred embodiment, if the word voice "Ohayou" (good morning) uttered by the speaker is not recognized, the word "Ohayou" (good morning) is registered as a speaker-specific word as follows:

Setup switch 9 is used to register a speaker-specific word as shown in FIG. 3. First, operate on start-of-registration button 92 on setup switch 9. This causes speech recognition and dialogue management unit 4 to activate the word registration mode. Normal recognition operations are not performed in this mode.

If the speaker presses the numeric key "1" assigned to the word "Ohayou" (good morning), speech recognition and dialogue management unit 4 detects that the operation called for is the registration of the word "Ohayou" (good morning), and performs controls so that a response "Say 'good morning'" is generated. When the speaker says "Ohayou" (good morning) because of this action, the resulting voice is transmitted from voice input unit 1 to voice analysis unit 2. A voice-analyzed characteristic vector is then transmitted to word enrollment unit 101. Based on the output from voice analysis unit 2, word enrollment unit 101 creates a new standard pattern that matches the speaker's voice characteristics from the DRNN standard pattern, i.e., the speaker-adapted standard pattern, and stores the new standard pattern in speaker-adapted standard pattern memory unit 102.

Figure 7A:
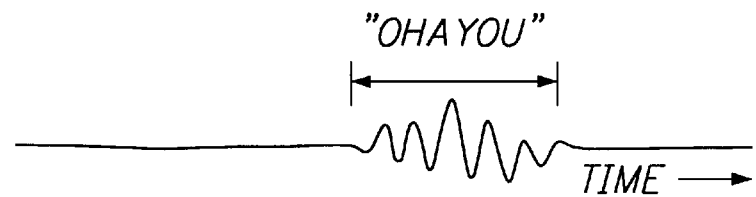
FIGS. 7A–7E diagrammatically illustrate a sample input voice waveform and resultant word lattice generated by both the specific and non-specific speaker word identification and enrollment units of the embodiment shown in FIG. 6.
Figure 7B:
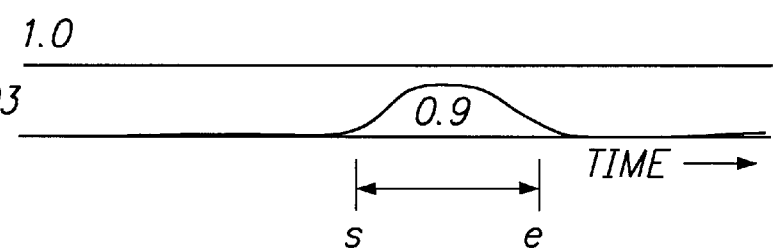
Figure 7C:
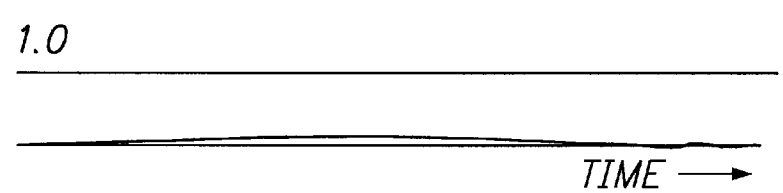
Figure 7D:
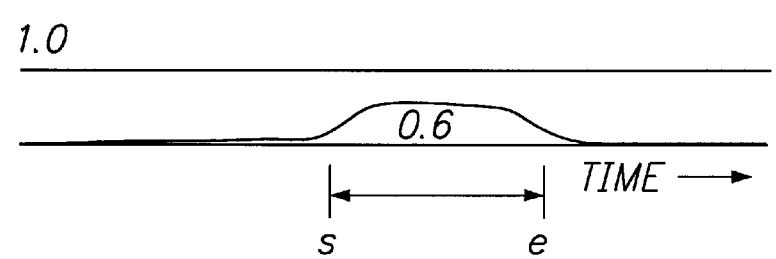
Figure 7E:
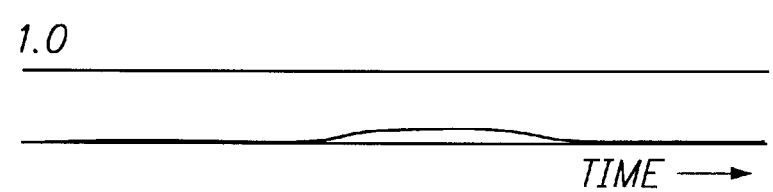

If the speaker utters the speaker-specific registered word "Ohayou" (good morning), word detection unit 32 outputs the word lattice shown in FIGS. 4A–4E, as explained in embodiment 1. In this case, the degree of similarity of the detection signal for detecting the word "Ohayou" relative to the speaker's "Ohayou" is low. Therefore, high degrees of similarity may occur in the detection signals for detecting other words. Suppose now that the signal waiting for the word "oyasumi" (good night) has a relatively high degree of similarity (0.6). On the other hand, the signal for detecting "Ohayou" from word detection unit 103 is output with a high degree of similarity as shown in FIG. 7B. This is because the output is produced as a result of a comparison between a speaker-adapted "Ohayou" standard pattern and the input voice "Ohayou" of the speaker. Note, here, that the speaker-specific word enrollment unit 10 generates confidence level information according to degree of similarity instead of deviation information, as in the case of the first preferred embodiment.

Speech recognition and dialogue management unit 4 determines a recognition candidate after receiving word lattices from word detection units 32 and 103. In this case, speech recognition and dialogue management unit 4 knows which words in the registered words are specific-speaker registered words (from the fact that word numbers are entered when the speaker registers the words). Therefore, instead of treating "oyasumi" as the sole potential recognition candidate for detecting "Ohayou" in the word lattice from word detection unit 32, the speech recognition and dialogue management unit additionally uses the detection data shown in FIG. 7B and compares the word lattices from word detection unit 103 and word detection unit 32. Although in FIGS. 7A–7E, detection data values from word detection unit 32 for only three words are shown, in actuality the word lattice for other non-specific speaker pre-registered words are also input into speech recognition and dialogue management unit 4.

Thus, speech recognition and dialogue management unit 4 compares the degrees of similarity obtained from word detection units 32 and 103, determines the recognition candidate, and comprehends the meaning of the input voice. In this case, the highest degree of similarity obtained from word detection unit 32 is 0.6 for "oyasumi" (good night). By contrast, the degree of similarity for "Ohayou" from word detection unit 103 is 0.9. Therefore, "Ohayou" is determined to be the recognition candidate.

If the word lattices received from word detection units 32 and 103 indicate several words with high degrees of similarity, several methods for determining the recognition candidate exist. In one method, the word with the highest degree of similarity is determined as the recognition candidate. In another method, a correlation table is created for each word indicating the correlation between the degrees of similarity of the words, and the recognition candidate is determined based upon this correlation table, as discussed previously hereinabove.

FIG. 6 shows that word detection unit 32 and word detection unit 103 are provided separately as word detection units. However, because a speaker-adaptation using a DRNN-based standard pattern is used for registering specific-speaker words, the baseline for the numerical values contained in the word lattices is the same. Therefore, word detection unit 32 can double as word detection unit 103, and can be conveniently implemented as is known to those ordinarily skilled in the art.

Recognition words are determined in response to a speaker's voice input as described above. Moreover, because unrecognizable words (registered words) can be registered as specific-speaker words, the problem of registered words not being recognized can be eliminated. Furthermore, previously registered standard patterns with poor recognition rates can be replaced by speaker-adapted standard pattern for registering speaker-specific words.

When a recognition and word is determined, speech recognition dialogue management unit 4 comprehends the mean ing of the input voice, determines a response, and outputs the response from voice output unit 7. In this case, though not shown in the figure, a fluctuation data detection unit that detects fluctuation data such as time, date, pressure, and temperature, as well as a memory units that stores these data can be provided. Based on these data, wide-ranging response data can be created. For example, if the speaker says "Ohayou" (good morning), the stuffed doll might be able to respond by saying, "Good morning, because it is so nice (from the pressure information), let's go to see the cherry blossoms (from the date information)". In such a conversation the stuffed doll's response to the speaker's words can be pre-registered in correspondence to the contents of the speaker's words.

In preferred embodiments 1 and 2 described above, response messages are prepared and stored on a pre-set basis using actors. By contrast, the third preferred embodiment allows the user to create responses using his own voice, the mother's voice, and friends' voices. This is explained with reference to FIG. 8.

Figure 8:
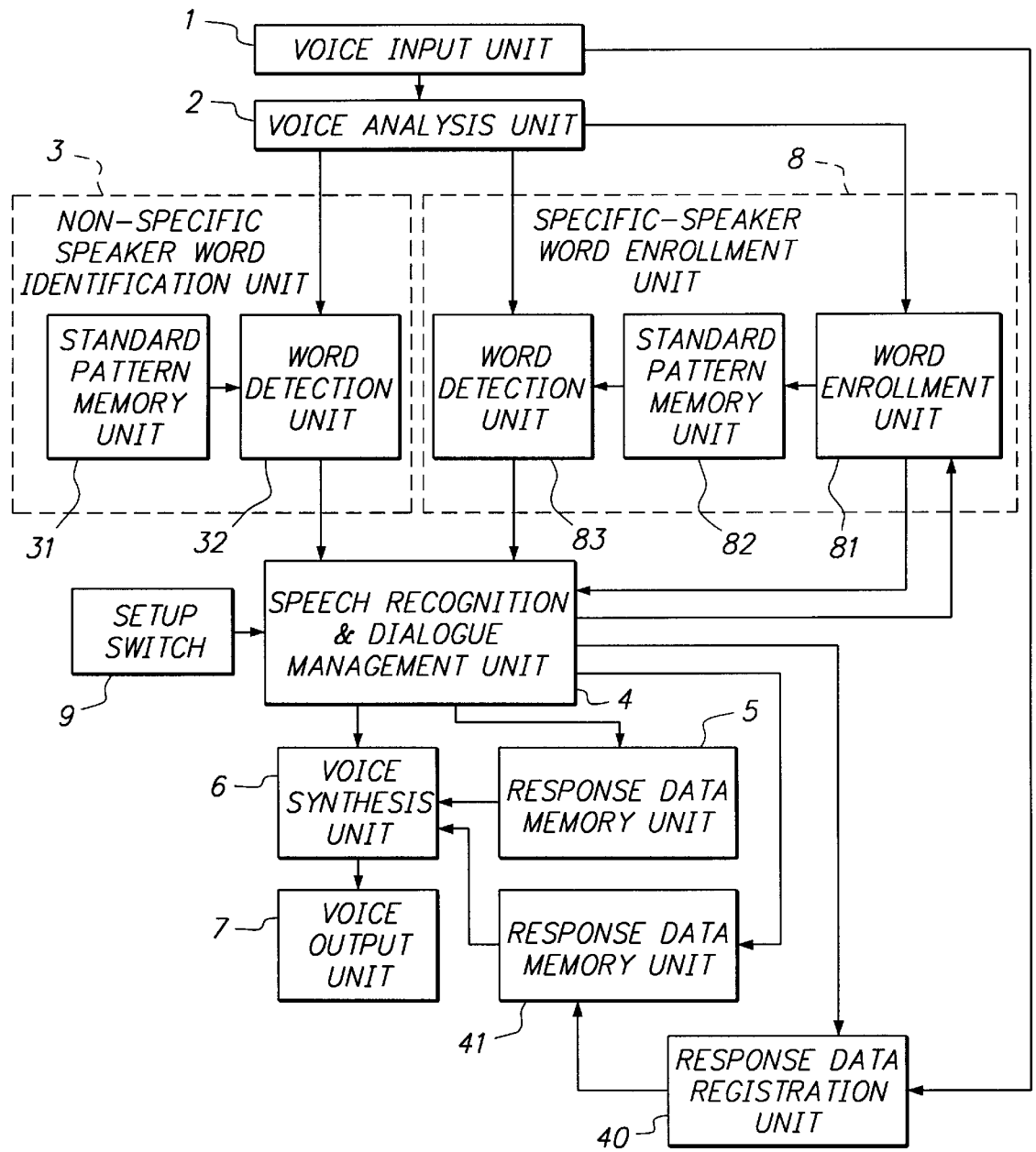
FIG. 8 is an overall block diagram of a third preferred embodiment.

The items in FIG. 8 that are identical to FIG. 1 are assigned the same reference numeral, and their further explanation is accordingly omitted. To implement Embodiment 3, the following new elements are provided: response data registration unit 40, which is used to store the user's own voice, the voices of members of the family, friends' voices, and other response data; and response data memory unit 41, which stores the responses registered by using response data registration unit 40. Registration unit 40 and memory unit 41 form the response creation function 42.

Figures 9, 10:
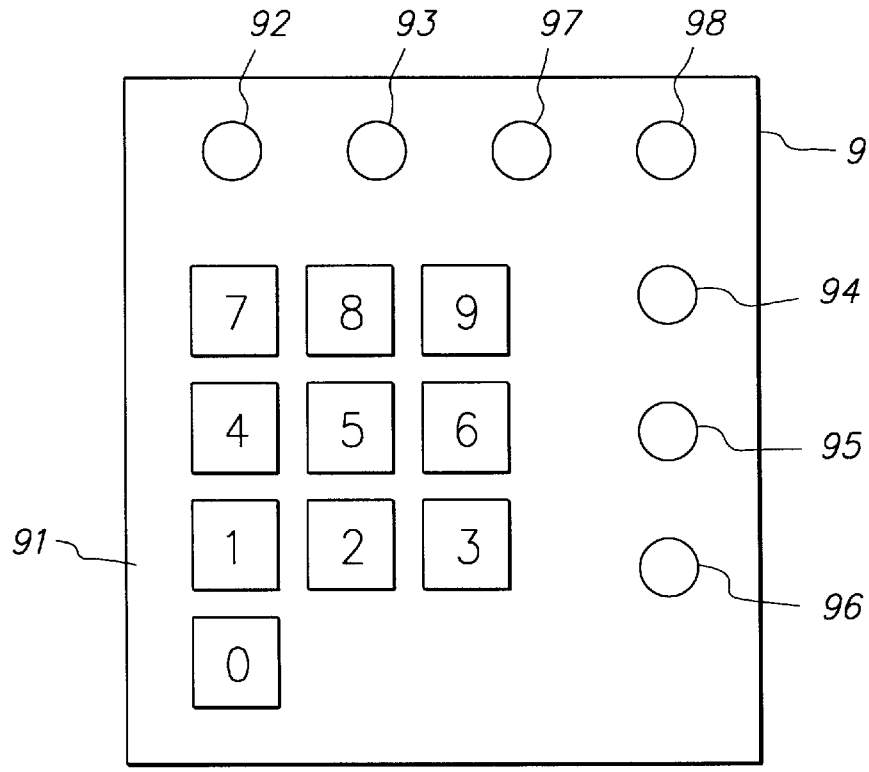
FIG. 9 illustrates an example setup switch according to the embodiment shown in FIG. 8.
FIG. 10 shows a example response table stored in the response data memory unit of the embodiment shown in FIG. 8.

Response data registration unit 40 creates response data that is compressed after the input voice received from voice input unit 1 is A/D converted. The response data created in this unit is stored in response data memory unit 41. It should be noted that registering of response data is done by pressing response message creation button 97 on setup switch 9 shown in FIG. 9. The setup switch 9 shown in FIG. 9 is for implementing Embodiment 3 and is basically the same as the setup switch shown in FIG. 3 except for the fact that this switch contains new buttons which are response message creation button 97 and response selection button 98. When response message creation button 97 is pressed, speech recognition and dialogue management unit 4 sets the equipment's mode to the response data registration mode, thus enabling response data to be registered. When the response data registration mode is on, processing operations such as word detection, shown in the first and second preferred embodiments, are not performed. Further, response selection button 98 is a selection switch that allows the user to select either using pre-stored response contents or storing new data. When the use of pre-stored responses is selected, speech recognition and dialogue management unit 4 references response data memory unit 5. When registering of new responses is selected, speech recognition and dialogue management unit 4 references response data memory unit 41. The configuration of setup switch 9 is by no means limited to that shown in FIG. 9; other setup buttons can also be provided as necessary.

Referring to FIGS. 8 and 9, in this configuration, response messages may be created using the voice of the mother of the child who plays with the stuffed doll. To do so, first press the response message creation button 97 on setup switch 9, enter the number "100", for example, from number key 91, and let the mother enter some response messages. This creates response data corresponding to the contents of the input response message in response data registration unit 40, and the associated response data is stored in response data memory unit 41. In this manner, not only the mother but also other designated persons can enter new response contents. When this is done, respective response data (designated response content a0, response content a1, response content a2, . . . ). In response data memory unit 41, the respective response data is stored as response content a0, response content a1, response content a2, . . . corresponding to response content numbers 100, 101, 102, as shown in FIG. 10. The response data memory unit 41 may share memory with response data memory unit 5 shown in said Embodiments 1 and 2. In such a setup, response content numbers 0 through 99 can be assigned to previously stored response contents at addresses 0 through 99, for example, so that response content numbers beginning with 100 are used as newly stored response contents that are stored addresses 100 and beyond.

It is in this manner that response contents using new voices are stored. These newly stored response contents are pre-set as the response content to be generated in response to words spoken by a speaker. For example, to register response content a0 ("Ohayou . . . (the child's name) . . . chan" in the mother's voice) for response content number 100 in response to the word associated with registered word 1 ("Ohayou"), first press the numeric key "1" on number key 91, press response content number input button 96, press the numeric key "100" from number key 91, and then press end-of-response message registration button 95. In this manner, the response contents can be associated with the registered words spoken by the speaker.

When the word corresponding to registered word number 1 is voice-input by a speaker when response selection button 98 is turned to the registered response content side, the equipment responds according to response content a0. Thus, if the child playing with the stuffed doll directs "Ohayou" at the doll, the doll replies "Ohayou . . . (the child's name) . . . chan" in the mother's voice.

Although in this example response selection button 98 is provided to allow the selection between using previously stored response contents or newly stored response contents, selecting is by no means limited to these methods. Alternatively, certain conditions can be stored in the equipment beforehand so that the speaker's utterances match the conditions, one of the response contents is selected. Nor is the method for associating the registered words spoken by a speaker with response contents limited to the above-described method. Various methods are conceivable as is known in the speech recognition and data processing arts.

Further, as explained in conjunction with the first preferred embodiment, using setup switch 9 and numeric values beginning with "11", the user can register his own recognizable words, and he can store new response contents a0, a1, a2, . . . corresponding to the newly stored words. Also, several response content numbers can be combined to create and store a variety of response contents, such as three responses, response content a0, response content a2, and response content a4.

Thus, according to the third preferred embodiment, responses using the voices of people close to the user, rather than a an actor's pre-recorded voice, can be stored. When applied to toys such as a stuffed doll, this embodiment can provide more enjoyable conversations with the user, which in this case would be a child. This prevents the toy from getting "old" quickly, a problem common to most toys.

Figure 11:
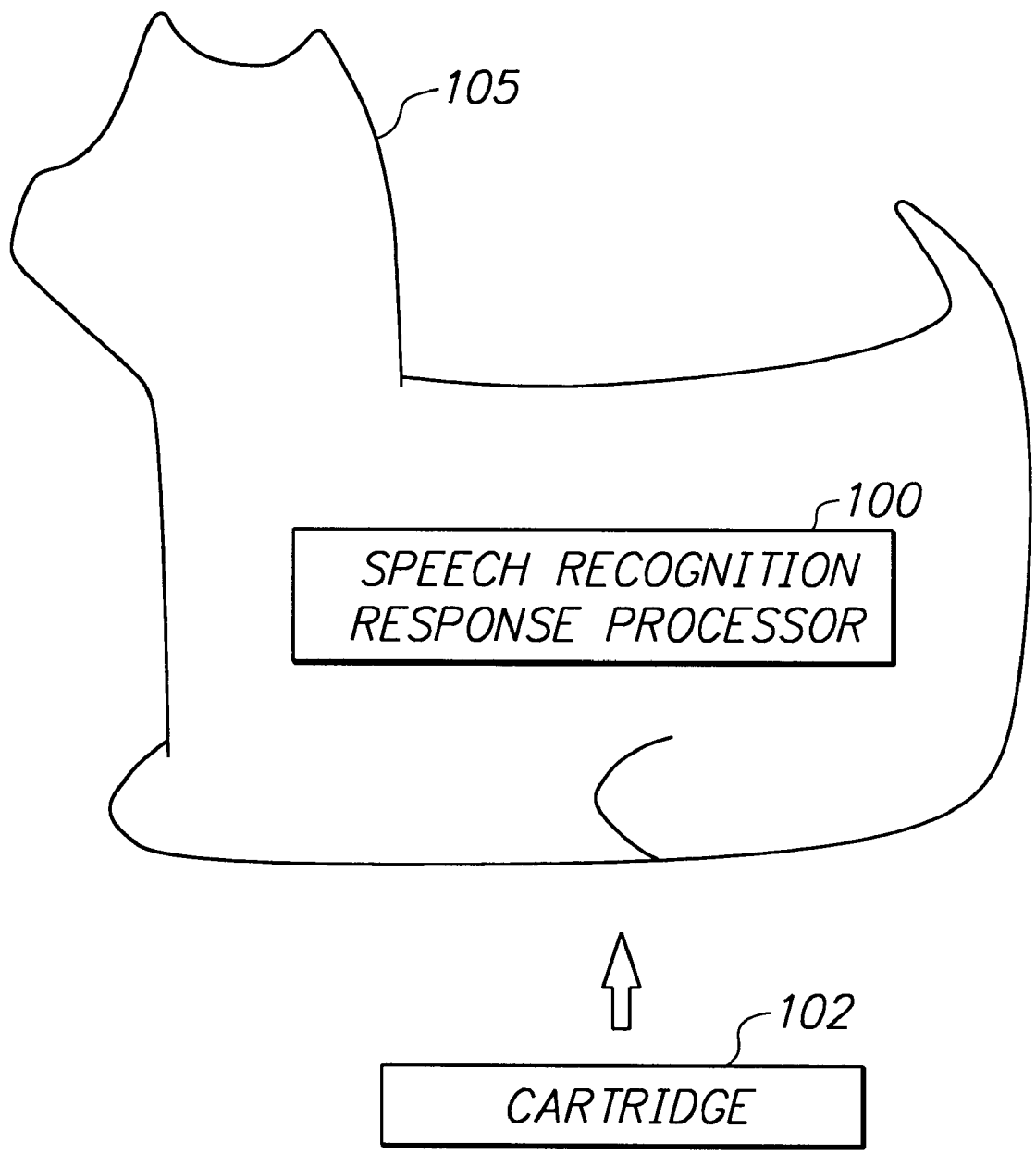
FIG. 11 is an overall block diagram of a fourth embodiment of the present invention explaining modularized recognition, conversation control and response information according to the present invention.

FIG. 11 explains the overall schematic configuration of the fourth embodiment of the present invention, which generally comprises speech recognition response processor 100 (detail to be explained herein below) contained inside a stuffed toy dog (device main unit) 105, and cartridge 102 (detail to be explained herein below) which can be detachably affixed to a specified location on the stuffed toy dog 105.

Figure 12:
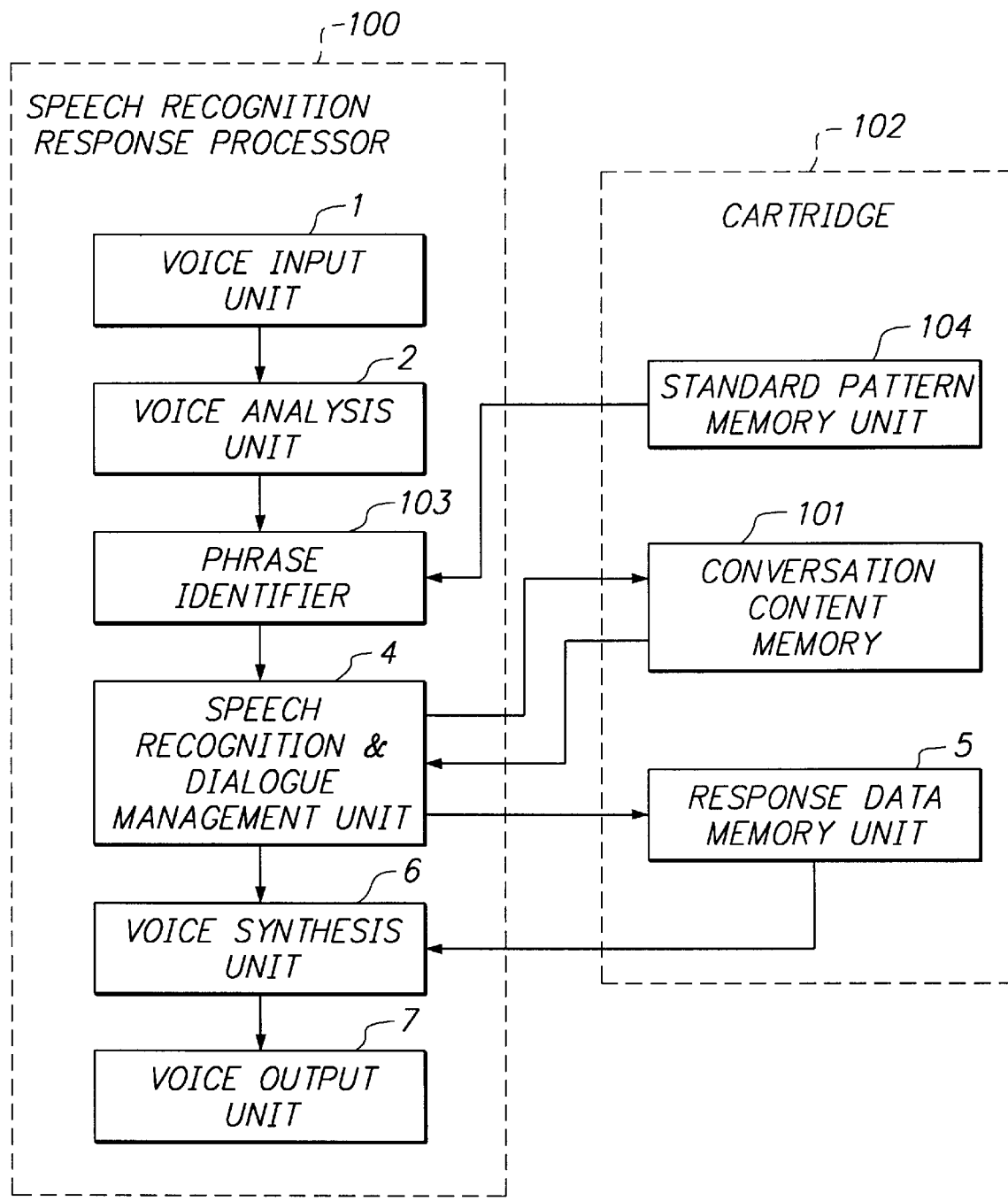
FIG. 12 is a more detailed block diagram of the embodiment of FIG. 11.

FIG. 12 is a more detailed block diagram for explaining the configuration of speech recognition response processor 100 and cartridge 102 of the fourth embodiment. In this embodiment, three preferably ROM devices (pattern memory unit 104, conversation content memory 101, and response data memory unit 5) are provided on the cartridge portion 102.

Speech recognition response processor 100 comprises voice input unit 1, voice analysis unit 2, phrase identifier 103, speech recognition and dialogue management unit 4, voice synthesis unit 6, speech output unit 7, etc. Of these configuration elements, voice analysis unit 2, phrase identifier 103, speech recognition and dialog managemnt unit 4, voice synthesis unit 6, etc. are contained in the vicinity of the belly of stuffed toy 100, for example; and voice input unit (microphone) 1 is physically provided within the ear area, and voice output unit (i.e. speaker) 7 is generally located in the mouth area of stuffed toy 1. It should be noted here that phrase identifier 103 preferably comprises a non-specific speaker word detection unit 32 as described with reference to the previously disclosed embodiments. Alternatively, the phrase identifier 103 could include combination of non-specific speaker word identification and specific speaker word enrollment also as discussed hereinabove, as will become readily apparent to those ordinarily skilled in the art.

On the other hand, cartridge 102 includes standard pattern memory unit 104 (which could be a composite of standard pattern memory units 31 and/or 82 as described with reference to the first three embodiments hereinabove), conversation content memory 102, and response data memory unit 5. The cartridge can be easily mounted on or removed from a cartridge mounting area (not shown in FIG. 11) provided in the vicinity of the belly of stuffed toy 1, for example. When this cartridge 102 is correctly mounted in the cartridge mounting area, it becomes electrically connected and positively coupled to the various areas of the speech recognition response processor 100, enabling at least read-only signal exchange as viewed by processor 100. More specifically, standard pattern memory unit 104 is designed to be in electrical communication with at least the phrase identifier 103, the conversation context memory 101 is in designed to be in electrical communication with the speech recognition and dialogue management unit 4, in the response data memory unit 5 is designed to be in electrical communication with both the speech recognition and dialogue management unit 4 and the voice synthesis unit 6 when the cartridge was mounted within the aforementioned cartridge mounting area.

The standard pattern memory unit 104 is a ROM device that stores (registers) the standard voice characteristic patterns or vectors, described hereinabove of recognizable phrases (called registered phrases) prepared in advance using voices spoken by a large number of people (around 200 people, for example) for individual phrases. Alternatively, as discussed hereinabove the standard pattern memory unit could, in addition to or in place of non-specific speaker word registration voice vector information, also include speaker specific voice vector information can be stored as will become apparent to those ordinarily skilled in the art. Since this embodiment again relates to a stuffed toy application, around 10 registered phrases are used here, and these are mostly greeting phrases such as "Ohayou" (Good morning), "Oyasumi" (Good night), "Konnichiwa" (Good day), "asu" (tomorrow), and "tenki" (weather). However, the registerable phrases are of course not limited to these few, and many kinds of phrases can be registered. Nor need the number of phrases that can be registered be limited to 10, as discussed previously.

The conversation content memory 101 (here also a ROM) stores the information related to the kind of phrases which have been registered and the kind of responses that should be issued to each of these registered phrases. Although this conversation content memory 104 should ordinarily be provided within the speech recognition and dialogue management unit 4, as is the case in the previously described embodiments, it is here provided within of cartridge 102 since registered phrases and consequent actions may change depending on the application and predefined word registry. Likewise, response data memory unit 5, as described above, stores the information for specifying the synthesized speech output to be issued in response as appropriate to the recognized phrases, and contains information that mainly specifies the voice characteristics, such as a boy's voice or a girl's voice (even for the same response content).

As explained above, various cartridges 20 may be provided for standard speech characteristics data, registered phrases, response contents for individual registered phrases, voice characteristics, etc., and these cartridges are designed such that the user of the stuffed toy can choose any desired cartridge. For example, in a cartridge for toddlers, multiple registered phrases based on standard speech characteristics data that facilitates the recognition of toddlers' voices are stored in standard pattern memory unit 104. The information related to the kind of phrases that have been registered and the kind of response that should be issued to each of the registered phrases is stored in conversation content memory 101. Furthermore, the instruction for specifying the synthesized speech output to be issued in response to the recognized phrases in light of the context and action rules will be stored in the externalized response data memory unit 5.

General recognition operations of the speech recognition response processor 100 is described hereinabove with reference to the prior three embodiments in FIGS. 1 through 10 herein. In this way, when the user mounts a selected cartridge 20 in stuffed toy 100, conversations become possible that are based on the content of cartridge 102. For example, if a cartridge for toddlers including registration, responses and context rules which are adapted specifically for the linguist abilities of a toddler are mounted, conversations appropriate for toddlers become possible. Meanwhile, the same toy can adapt to an elementary school aged child simply by swapping cartridges, which, in this example involves switching the toddler cartridge with a suitable cartridge 102 containing words, phrases, actions, context rules and responses tailored to the conversational abilities of this age group. Note generally that various types of cartridges can be provided for various age groups or different sexes. For example, cartridges can be provided for such detailed classification groups as boy toddlers, girl toddlers, younger elementary school boys, and younger elementary school girls or even handicapped individuals (as appropriate) or others with particularized vocabulary needs.

In this way, even with a single device main unit (a stuffed toy in this case), conversations tailored to various ages or different sexes become possible merely by changing the cartridges. Furthermore, because standard pattern memory unit 104, conversation content memory 101, and response data memory unit 5 are all integrated in cartridge 20 in this embodiment, recognizable phrases and their standard speech characteristics data can be varied for each cartridge, and the response to those recognizable phrases and voice characteristics can also be varied for each cartridge. Therefore, by increasing the variation in cartridge types, conversations tailored to various ages or different sexes become possible without significantly adding to the word registry or imparting additional recognition overhead to the speech recognition processor 100.

As described above with reference to the fourth embodiment of the present invention as depicted in FIGS. 11 and 12, standard pattern memory unit 104, conversation content memory unit 5, and response data memory unit 5 are all integrated in cartridge 102. However, cartridge 102 need not possess all these three elements, and need possess only standard pattern memory unit 104 or other permutations thereof, such as response data memory 5, for example, or any required by the specific speech recognition application or requirements of a targeted class of users.

Here, cases will be explained in which only standard pattern memory unit 104 is provided in cartridge 102, conversation content memory 101 and response data memory unit 5 are provided in tandem within cartridge 102, as well as a scenario in which only response data memory unit 5 is provided in cartridge 102.

Figure 13:
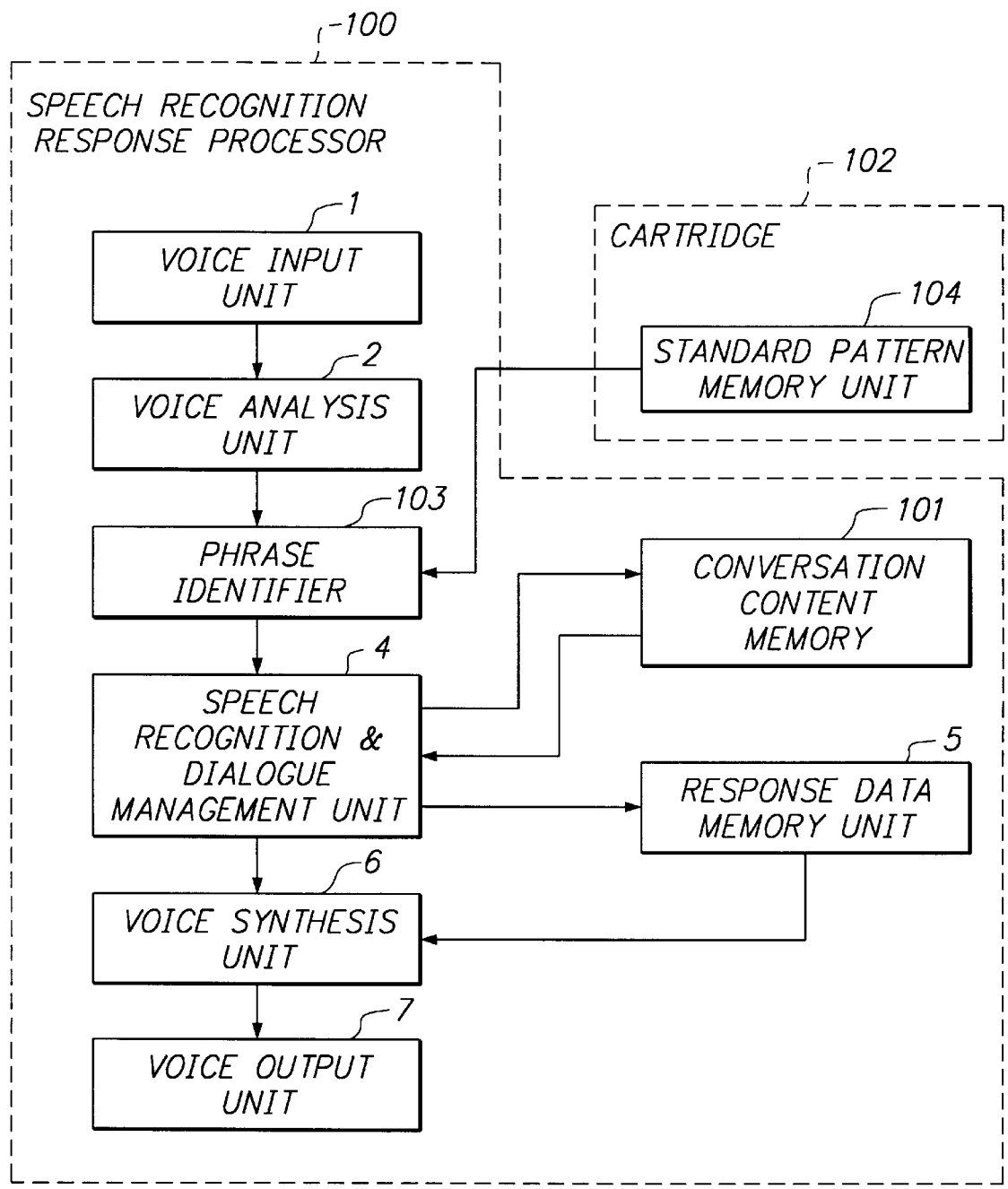
FIG. 13 is an alternative detailed block diagram of the embodiment shown in FIG. 11 wherein only phrase registry information is contained on the cartridge.

First, a case will be explained in which only standard pattern memory unit 104 is externalized onto cartridge 102. FIG. 13 is a block diagram showing this configuration, and like numerals represent like parts as in FIG. 12 discussed hereinabove. In other words, conversation content memory 101 and response data memory unit 5 reside within the main speech recognition response processor 100 in this case. Note too, as described hereinabove, that although it is possible to provide response content memory 101 inside speech recognition and dialogue management unit 4, it is provided as a separate element in this alternative.

When only standard pattern memory unit 104 is provided within the satellite cartridge 102, and conversation content memory 101 and response data memory unit 5 are provided within the main device (stuffed toy 100), responses to be issued and actions taken in response to in replay to each of the recognized phrases is limited by the device itself. However, although the registered phrases include only those phrases contained on the cartridge as (i.e., here around 10 phrases such as "Ohayou" (Good morning), "Konnichiwa" (Good day), and "Oyasumi" (Good night), it is still possible, unlike conventional "canned" recognition devices, to use different cartridges to provide various standard speech characteristics data for each of the registered phrases depending on age or sex. For example, it is possible to provide cartridges containing various standard speech characteristics data for each of the registered phrases depending on age or sex, such as a cartridge containing the standard speech characteristics data of toddlers for each of the registered phrases, a cartridge containing the standard speech characteristics data of elementary school children for each of the registered phrases, a cartridge containing the standard speech characteristics data of female adults for each of the registered phrases, and a cartridge containing the standard speech characteristics data of male adults for each of the registered phrases.

For example, if a toddler is using the device, a cartridge containing the speech characteristics data for toddlers can be selected and mounted in the device main unit. By doing so, the input speech can be compared with the speech characteristics data obtained based on the characteristics of toddlers' speech, which results in higher recognition rates. A predetermined response content is then synthesized and output, in reply to the phrase recognized. Recognition rates can be substantially increased by selecting a cartridge containing standard speech characteristics data according to the age or sex of the user in the manner described above.

Figure 14:
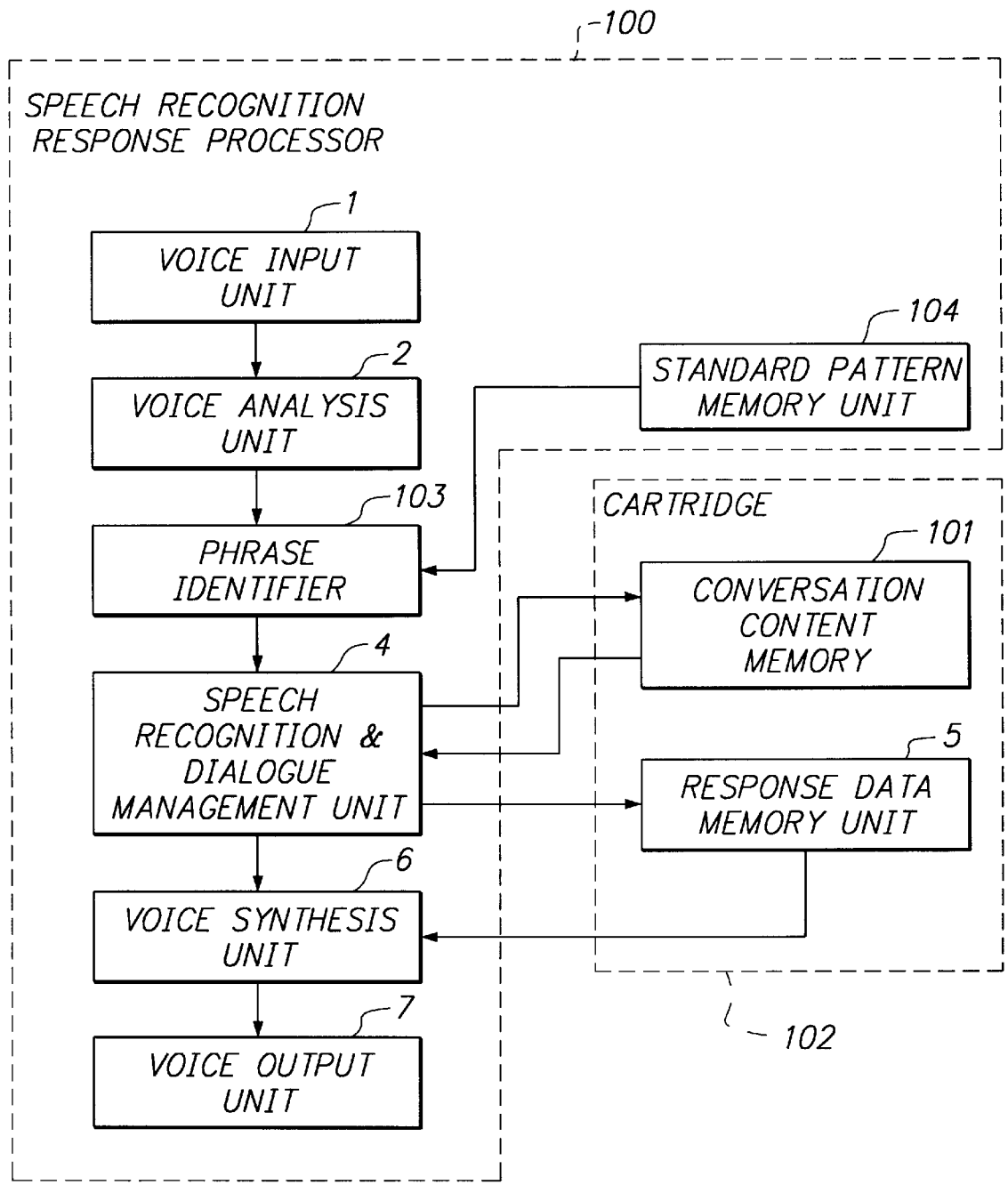
FIG. 14 is another detailed block diagram showing yet another alternative configuration of the embodiment of FIG. 11 wherein only context and conversation response, along with response data is externalized to the cartridge.

Next, an alternative will be explained in which conversation content memory and response data memory unit 5 are externalized onto cartridge 102. FIG. 14 is a block diagram showing this configuration, and the same numerals are used to denote the same areas as in FIGS. 12 and 13. In other words, pattern memory unit 104 is maintained within speech recognition response processor 100, and conversation content memory 101 and response data memory unit 5 are provided within cartridge 102.

When only conversation content memory 101 and response data memory unit 5 are provided within cartridge 102, the registered phrases will include only those phrases prestored within the main device. However, it is possible to use different cartridges to provide various response contents for each of the registered phrases and synthesized speech output (such as voice quality) for each of the response contents. For example, several kinds of responses to be made for the pre-registered phrase "Ohayou" [Good morning] and several types of synthesized speech outputs may be specified, which are then stored in conversation content memory 101 and response data memory unit 5 of the cartridge. Various cartridges can be provided for generating responses that match the age or sex of the user in an appropriate voice. For example, a cartridge for toddlers would make the device respond to such registered phrases as "Ohayou" [Good morning] and "Oyasuini" [Good night] with content appropriate for toddlers in a toddler's voice; and a cartridge for elementary school children would make the device respond to registered phrases with content appropriate for elementary school children while imitating the speech mannerism of a TV cartoon character.

In this way, if an elementary school child for example, is using the device, by selecting and mounting the cartridge for elementary school students described above, the device can respond to any of the registered phrases spoken by the child, with the content preset in the cartridge, imitating the voice quality and speech mannerism of a TV cartoon character.

Figure 15:
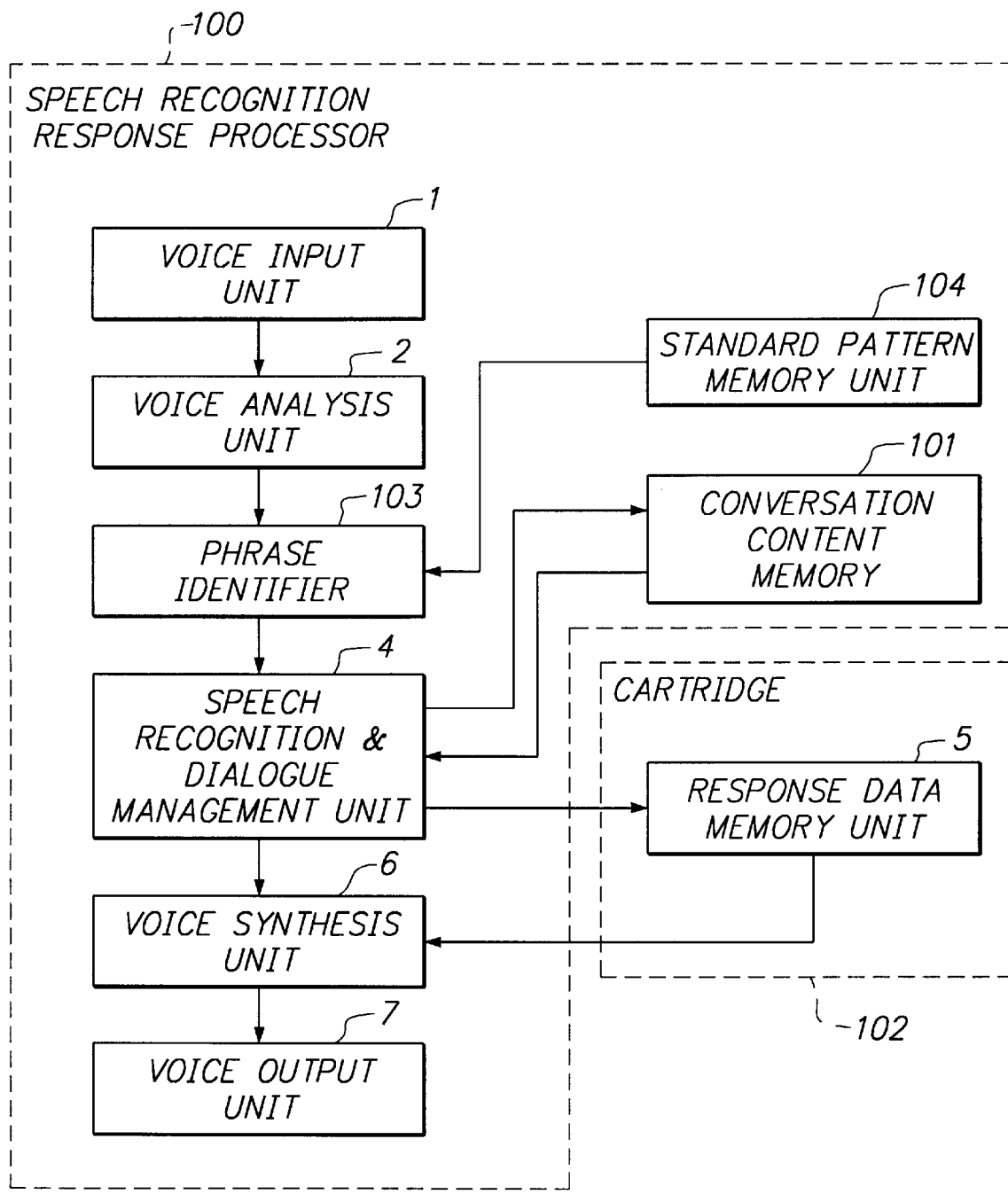
FIG. 15 is yet another detailed block diagram depicting still another alternative configuration of the embodiment of FIG. 11 wherein only response data is maintained external to the speech recognition response processor.

Next, an alternative will be explained in which only response data memory unit 5 is offloaded to cartridge 102. FIG. 15 is a block diagram showing this configuration, and like numerals represent like parts as in FIGS. 12–14 described hereinabove. In other words, standard pattern memory unit 104 and conversation content memory 101 are provided within the main device 100, and only response data memory unit 5 is provided within cartridge 102.

When only response data memory unit 5 is contained cartridge 102, and standard pattern memory unit 104 and conversation content memory 101 are retained in speech recognition response processor 100, the registered phrases include only those phrases preset within by device 100, and the response to be issued in reply to each of the registered phrases is basically predetermined by the device. However, it is still possible to use different cartridges to provide various voice characteristics for the synthesized speech output. For example, several kinds of voice characteristics to be used for the response to be made for the phrase "Ohayou" (Good morning) are predetermined, which are then stored in conversation content memory 101 of each cartridge. Specifically, various cartridges can be provided that store the information for specifying the synthesized speech output to be issued in response to each of the registered phrases according to age and sex. For example, a cartridge for toddlers would contain the specification for making the device respond to such registered phrases as "Ohayo" (Good morning) and "Oyasumi" (Good night) in a mother-like voice or the voice of a TV cartoon character for toddlers; and a cartridge for elementary school children would contain the specification for making the device respond to registered phrases by imitating the speech mannerism of a TV cartoon character. Note that the response to be issued for each of the registered phrases in these cases is, of course basically preset in this alternative configuration of the fourth preferred embodiment of the invention.

In this way, if an elementary school child for example, is using the device, by selecting and mounting the cartridge for elementary school students described above, the device can respond to any of the registered phrases spoken by the child, by imitating the voice and speech mannerism of a TV cartoon character, as described above, even though the response content is basically a preset one.

As explained above, the invention provides specific ROM areas, such as standard pattern memory unit 104, conversation content memory 101, and response data memory unit 5, held within cartridge format, and various cartridges that contain standard speech characteristics data and response content for different ages and sexes are made available for users to select. Therefore, even a single speech recognition device or toy can be used by a wide variety of users, enabling speech recognition and conversation tailored to the user.

Although the above embodiments include examples wherein the present invention is applied to a stuffed doll toy, the present invention is by no means limited to stuffed dolls. Naturally, it can be applied to other toys as well. Further, in addition to toys, the invention can be applied to interactive game machines and electronic appliances that are used in everyday life. And certainly, an ordinary skill in the speech recognition art can apply the invention to languages other than Japanese or English and still obtain the desired objects. Thus, the invention has a broad range of application.

While the invention has been described in conjunction with several specific embodiments and applications, it is evident to those skilled in the art that many further alternatives, modifications and variations will be apparent in light of the foregoing description. This may include, in addition to stuffed animal toys, such applications and embodiments as gaming machines, home electronics, computer subsystems, electronic appliances or similar devices. Thus, the invention described herein is intended to embrace all such alternatives, modifications, applications and variations as may fall within the spirit and scope of the appended claims.

What is claimed is:

1. A method for performing interactive speech recognition processing, comprising the steps of:

receiving voice and translating the received voice into digital form;

generating characteristic voice data for the received digitized voice;

determining whether the characteristic voice data substantially matches standard characteristic voice information corresponding to pre-registered expressions and generating phrase identification data in response thereto, wherein the pre-registered expressions are stored as standard speech patterns capable of recognition in a removable cartridge releasably communicating with said phrase identification unit, said removable cartridge comprising a first memory to retain the standard speech patterns;

recognizing a meaning from the received voice based on the received phrase identification data and formulating an appropriate response corresponding to the recognized meaning;

enabling the creation of response data based on inputted information; and generating synthesized audio corresponding to the appropriate response formulated in said recognizing and formulating step.

2. The method of claim 1, wherein said removable cartridge includes a second memory to retain conversation content data used to recognize the meaning from the received and recognized voice.

3. The method of claim 2, wherein said removable cartridge includes a third memory to retain response data used to formulate and synthesize the appropriate response to the received and recognized voice.

4. The method of claim 3, wherein said first, second and third cartridge memories reside within at least one ROM device.

5. The method of claim 3, wherein said first, second and third cartridge memories reside within at least one EEPROM device.

6. The method of claim 1, wherein said removable cartridge includes a second memory to retain response data used to formulate and synthesize the appropriate response to the received and recognized voice.

7. A method for performing interactive speech recognition processing, comprising the steps of:

receiving voice and translating the received voice into digital form;

generating characteristic voice data for the received digitized voice;

determining whether the characteristic voice data substantially matches standard characteristic voice information corresponding to pre-registered expressions and generating phrase identification data in response thereto;

recognizing a meaning from the received voice based on the received phrase identification data and conversation content information stored in a first memory of a removable cartridge releasably communicating therewith, and formulating an appropriate response corresponding to the recognized meaning;

enabling the creation of response data based on inputted information; and generating synthesized audio corresponding to the appropriate response formulated in said recognizing and formulating step.

8. The method of claim 7, wherein said removable cartridge includes a second memory to retain response data used to formulate and synthesize the appropriate response to the received and recognized voice.

9. The method of claim 8, wherein said first and second cartridge memories reside within at least one ROM device.

10. The method of claim 8, wherein said first and second cartridge memories reside within at least one EEPROM device.

* * * * *

UNITED STATES PATENT AND TRADEMARK OFFICE
CERTIFICATE OF CORRECTION

PATENT NO. : 5,946,658
DATED : August 31, 1999
INVENTOR(S) : Yasunaga Miyazawa, et al.

It is certified errors appear in the above identified patent and that said Letters Patent is hereby corrected as shown below:

Title page, item 54, Title, change "Response Creation" to --Response-Creation--.

Column 22, line 46, delete "releasably communicating with said phrase identification unit".

Column 24, line 2, delete "releasably communicating therewith".

Signed and Sealed this

Twenty-ninth Day of February, 2000

Attest:

Q. TODD DICKINSON

Attesting Officer

Commissioner of Patents and Trademarks